US012366233B2

(12) United States Patent
Theisen et al.

(10) Patent No.: US 12,366,233 B2
(45) Date of Patent: Jul. 22, 2025

(54) ELECTRICALLY OPERATED PUMP FOR A PLURAL COMPONENT SPRAY SYSTEM

(71) Applicant: Graco Minnesota Inc., Minneapolis, MN (US)

(72) Inventors: Matthew R. Theisen, Woodbury, MN (US); Arthur T. Graf, Roseville, MN (US); Bryan K. Colby, New Brighton, MN (US); Andrew J. Ericson, Andover, MN (US); Nicholas K. Studt, Moscow, ID (US); Erich W. Beckmann, Minneapolis, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 204 days.

(21) Appl. No.: 17/914,657

(22) PCT Filed: Mar. 31, 2021

(86) PCT No.: PCT/US2021/025132
§ 371 (c)(1),
(2) Date: Sep. 26, 2022

(87) PCT Pub. No.: WO2021/202698
PCT Pub. Date: Oct. 7, 2021

(65) Prior Publication Data
US 2023/0125161 A1    Apr. 27, 2023

Related U.S. Application Data

(60) Provisional application No. 63/002,685, filed on Mar. 31, 2020.

(51) Int. Cl.
*F04B 13/02* (2006.01)
*F04B 5/02* (2006.01)
(Continued)

(52) U.S. Cl.
CPC .............. *F04B 13/02* (2013.01); *F04B 17/03* (2013.01); *F04B 53/14* (2013.01); *H02K 7/06* (2013.01); *F04B 5/02* (2013.01)

(58) Field of Classification Search
CPC .......... F04B 13/02; F04B 17/03; F04B 53/14; F04B 5/02; H02K 7/06; F16H 25/186
See application file for complete search history.

(56) References Cited

U.S. PATENT DOCUMENTS 1,650,377 A    11/1927    Leroy
1,865,350 A     6/1932    William
(Continued)

FOREIGN PATENT DOCUMENTS

AT          401693 B  *  9/1996  ............... A62C 5/02
CN       87202952 U      3/1988
(Continued)

OTHER PUBLICATIONS

English Machine Translation of CN-103397997-A (Year: 2013).*
(Continued)

*Primary Examiner* — Nathan C Zollinger
(74) *Attorney, Agent, or Firm* — Kinney & Lange, P.A.

(57) ABSTRACT

An electrically operated pumping assembly for a plural component spray system includes an electric motor (14) having a stator (88) and a rotor (90). The rotor is disposed coaxially with first and second pumps (26a, 26b) and is configured to cause pumping by each of the first and second pumps. The first and second pumps are configured to pump different component materials to an applicator (34) for forming a plural component spray material. A drive mechanism (86) is disposed between and connected to each of the rotor and the fluid displacement members (70a, 70b) of the first and second pumps. The drive mechanism receives a (Continued)

rotational output from the rotor and provides a linear input to the first and second pumps to cause pumping.

13 Claims, 22 Drawing Sheets

(51) Int. Cl.
  *F04B 17/03* (2006.01)
  *F04B 53/14* (2006.01)
  *H02K 7/06* (2006.01)

(56) References Cited

U.S. PATENT DOCUMENTS

| | | | |
|---|---|---|---|
| 1,926,403 A | 9/1933 | Phillips | |
| 2,069,471 A | 2/1937 | Baker | |
| 2,286,263 A | 6/1942 | Comins | |
| 2,368,131 A | 1/1945 | French | |
| 2,407,792 A | 9/1946 | McMillan | |
| 2,446,393 A | 8/1948 | Russell | |
| 2,464,936 A | 3/1949 | McConaghy | |
| 2,491,230 A | 12/1949 | Theis | |
| 2,508,253 A | 5/1950 | Haggardt | |
| 2,737,817 A | 3/1956 | Harris et al. | |
| 2,752,854 A | 7/1956 | Prior et al. | |
| 2,821,404 A | 1/1958 | Sloan | |
| 2,844,103 A | 7/1958 | Allen | |
| 3,075,468 A | 1/1963 | Eifel | |
| 3,164,101 A | 1/1965 | Nederynen | |
| 3,207,080 A | 9/1965 | Schlosser | |
| 3,250,225 A | 5/1966 | Taplin | |
| 3,276,389 A | 10/1966 | Bower | |
| 3,354,830 A | 11/1967 | Mortara | |
| 3,414,302 A | 12/1968 | Priest | |
| 3,416,461 A | 12/1968 | Rolland | |
| 3,501,180 A | 3/1970 | Waara | |
| 3,542,491 A | 11/1970 | Newman | |
| 3,652,187 A | 3/1972 | Loeffler et al. | |
| 3,670,630 A | 6/1972 | Tyson et al. | |
| 3,680,981 A | 8/1972 | Wagner | |
| 3,741,689 A | 6/1973 | Rupp | |
| 3,769,879 A | 11/1973 | Lofquist | |
| 3,775,030 A | 11/1973 | Wanner | |
| 3,814,086 A | 6/1974 | Lemb | |
| 3,849,033 A | 11/1974 | Schall | |
| 3,857,642 A | 12/1974 | Miller | |
| 3,916,449 A | 11/1975 | Davis | |
| 3,967,542 A | 7/1976 | Hall et al. | |
| 3,999,896 A | 12/1976 | Sebastiani | |
| 4,008,984 A | 2/1977 | Scholle | |
| 4,060,351 A | 11/1977 | Cloup | |
| 4,068,982 A | 1/1978 | Quarve | |
| 4,123,204 A | 10/1978 | Scholle | |
| 4,145,165 A * | 3/1979 | Perkins | F04B 53/144 |
| | | | 417/418 |
| 4,276,003 A * | 6/1981 | Perkins | F04B 9/02 |
| | | | 417/415 |
| 4,277,706 A | 7/1981 | Isaacson | |
| 4,348,159 A | 9/1982 | Acheson | |
| 4,365,745 A | 12/1982 | Beck | |
| 4,366,723 A | 1/1983 | Wilke et al. | |
| 4,403,924 A | 9/1983 | Gebauer et al. | |
| 4,459,089 A | 7/1984 | Vincent et al. | |
| 4,511,276 A | 4/1985 | Doutt | |
| 4,526,053 A | 7/1985 | Carson | |
| 4,549,467 A | 10/1985 | Wilden et al. | |
| 4,615,259 A | 10/1986 | Anbe | |
| 4,635,621 A | 1/1987 | Atkinson | |
| 4,637,193 A | 1/1987 | Lange | |
| 4,681,516 A | 7/1987 | Ohara et al. | |
| 4,696,211 A | 9/1987 | Bitzel | |
| 4,749,300 A | 6/1988 | Berger et al. | |
| 4,778,356 A | 10/1988 | Hicks | |
| 4,815,360 A | 3/1989 | Winterle | |
| 4,883,412 A | 11/1989 | Malizard et al. | |
| 4,902,206 A | 2/1990 | Nakazawa et al. | |
| 5,053,660 A * | 10/1991 | Sneddon | F16H 25/20 |
| | | | 310/20 |
| 5,061,077 A | 10/1991 | Whiteman | |
| 5,066,199 A | 11/1991 | Reese et al. | |
| 5,076,761 A | 12/1991 | Krohn et al. | |
| 5,106,274 A | 4/1992 | Holtzapple | |
| 5,122,032 A | 6/1992 | Shields et al. | |
| 5,128,688 A | 7/1992 | West | |
| 5,135,329 A | 8/1992 | Yuda | |
| 5,145,339 A | 9/1992 | Lehrke et al. | |
| 5,165,869 A | 11/1992 | Reynolds | |
| 5,174,731 A | 12/1992 | Korver | |
| 5,213,485 A | 5/1993 | Wilden | |
| 5,219,274 A | 6/1993 | Pawlowski et al. | |
| 5,249,932 A | 10/1993 | Van | |
| 5,253,981 A | 10/1993 | Yang et al. | |
| 5,257,914 A | 11/1993 | Reynolds | |
| 5,279,504 A | 1/1994 | Williams | |
| 5,312,233 A | 5/1994 | Tanny et al. | |
| 5,362,212 A | 11/1994 | Bowen et al. | |
| 5,378,122 A | 1/1995 | Duncan | |
| 5,407,292 A | 4/1995 | Collins | |
| 5,413,031 A | 5/1995 | Kohlmeyer | |
| 5,440,282 A | 8/1995 | Devendorf et al. | |
| 5,484,270 A | 1/1996 | Adahan | |
| 5,509,766 A | 4/1996 | Leuschner | |
| 5,525,515 A | 6/1996 | Blattner | |
| 5,527,160 A | 6/1996 | Kozumplik et al. | |
| 5,557,154 A | 9/1996 | Erhart | |
| 5,567,118 A | 10/1996 | Grgurich et al. | |
| 5,616,005 A | 4/1997 | Whitehead | |
| 5,649,809 A | 7/1997 | Stapelfeldt | |
| 5,711,709 A | 1/1998 | McCoy | |
| D390,923 S | 2/1998 | Stevens | |
| 5,751,125 A | 5/1998 | Weiss | |
| 5,816,778 A | 10/1998 | Elsey et al. | |
| 5,844,335 A * | 12/1998 | Sekiguchi | H02K 7/06 |
| | | | 310/80 |
| 5,927,954 A | 7/1999 | Kennedy et al. | |
| 5,939,813 A | 8/1999 | Schoeb | |
| 6,032,349 A | 3/2000 | Wagner et al. | |
| 6,036,445 A | 3/2000 | Reynolds | |
| 6,068,448 A * | 5/2000 | Muratsubaki | F04B 3/00 |
| | | | 417/536 |
| 6,092,992 A | 7/2000 | Imblum et al. | |
| 6,092,995 A | 7/2000 | Morikawa | |
| 6,106,246 A | 8/2000 | Steck et al. | |
| 6,109,878 A | 8/2000 | Barton et al. | |
| 6,135,722 A | 10/2000 | Kawaguchi et al. | |
| 6,139,288 A | 10/2000 | Karasawa | |
| 6,142,749 A | 11/2000 | Jack et al. | |
| 6,158,982 A | 12/2000 | Kennedy et al. | |
| 6,174,136 B1 | 1/2001 | Kilayko et al. | |
| 6,183,225 B1 | 2/2001 | Thompson | |
| 6,212,998 B1 | 4/2001 | Thompson et al. | |
| 6,280,149 B1 | 8/2001 | Able et al. | |
| 6,299,415 B1 | 10/2001 | Bahrton | |
| 6,402,486 B1 | 6/2002 | Steck et al. | |
| 6,428,287 B1 | 8/2002 | Denkins et al. | |
| 6,468,057 B1 | 10/2002 | Beck | |
| 6,474,961 B1 | 11/2002 | Timmer et al. | |
| 6,533,488 B2 | 3/2003 | Blenkush et al. | |
| 6,609,646 B2 | 8/2003 | Miller et al. | |
| 6,764,284 B2 | 7/2004 | Oehman | |
| 6,811,380 B2 | 11/2004 | Kim | |
| 6,935,846 B2 | 8/2005 | Jesse | |
| 6,994,500 B2 | 2/2006 | Ward et al. | |
| 7,036,752 B1 | 5/2006 | Hsiang | |
| 7,080,792 B2 * | 7/2006 | Muratsubaki | F04B 49/065 |
| | | | 239/69 |
| 7,112,025 B2 | 9/2006 | Ward et al. | |
| 7,128,541 B2 | 10/2006 | Kaech | |
| 7,242,118 B2 | 7/2007 | Sakamoto | |
| 7,399,168 B1 | 7/2008 | Eberwein | |
| 7,448,857 B1 | 11/2008 | Fugere | |
| 7,492,074 B1 | 2/2009 | Rittenhouse | |
| 7,517,199 B2 | 4/2009 | Reed et al. | |
| 7,568,874 B2 | 8/2009 | Riedel et al. | |

(56) References Cited

U.S. PATENT DOCUMENTS

| | | | |
|---|---|---|---|
| 7,600,985 B2 | 10/2009 | Meloche et al. |
| 7,626,308 B2 | 12/2009 | Kang et al. |
| 7,654,801 B2 | 2/2010 | Spude |
| 7,658,598 B2 | 2/2010 | Reed et al. |
| 7,758,321 B2 | 7/2010 | Fukano et al. |
| 7,918,654 B2 | 4/2011 | Adahan |
| 8,053,944 B2 | 11/2011 | Calley et al. |
| 8,083,470 B2 | 12/2011 | Yu et al. |
| 8,123,500 B2 | 2/2012 | Jueterbock et al. |
| 8,167,583 B2 | 5/2012 | Harnetiaux et al. |
| 8,167,586 B2 | 5/2012 | Towne |
| 8,177,524 B1 | 5/2012 | Kieffer et al. |
| 8,182,247 B2 | 5/2012 | Gallwey et al. |
| 8,292,600 B2 | 10/2012 | Reed et al. |
| 8,313,313 B2 | 11/2012 | Juterbock et al. |
| 8,337,166 B2 | 12/2012 | Meza et al. |
| 8,382,445 B2 | 2/2013 | Roseberry |
| 8,393,881 B2 | 3/2013 | Usui et al. |
| 8,405,275 B2 | 3/2013 | Calley et al. |
| 8,485,792 B2 | 7/2013 | McCourt et al. |
| 8,529,223 B2 | 9/2013 | Cohoon et al. |
| 8,581,866 B2 | 11/2013 | Park et al. |
| 8,585,372 B2 | 11/2013 | Bacher et al. |
| 8,602,751 B2 | 12/2013 | Courier |
| 8,845,298 B2 * | 9/2014 | Larsen .................... F04B 43/09 417/42 |
| 8,847,529 B2 | 9/2014 | Dixon et al. |
| 9,068,567 B2 | 6/2015 | Hitter et al. |
| 9,212,657 B2 | 12/2015 | Reukers |
| 9,221,669 B2 * | 12/2015 | Tix ............................ F01N 5/02 |
| 9,316,218 B2 | 4/2016 | McCourt et al. |
| 9,385,576 B2 | 7/2016 | Lu et al. |
| 9,638,185 B2 | 5/2017 | Hines et al. |
| 10,046,351 B2 | 8/2018 | Brudevold et al. |
| 10,161,393 B2 | 12/2018 | Hines et al. |
| 10,594,192 B1 | 3/2020 | Kaul |
| 10,900,583 B2 | 1/2021 | Gagliano et al. |
| 11,009,016 B2 * | 5/2021 | Davids .................... F04B 19/22 |
| 11,174,854 B2 * | 11/2021 | Hines ........................ F04B 1/02 |
| 2001/0029838 A1 | 10/2001 | Blenkush et al. |
| 2001/0048882 A1 | 12/2001 | Layman |
| 2002/0079016 A1 | 6/2002 | Webb |
| 2002/0153794 A1 | 10/2002 | Kawasaki et al. |
| 2003/0000765 A1 | 1/2003 | Spadafora |
| 2003/0099550 A1 | 5/2003 | Kim |
| 2003/0161746 A1 | 8/2003 | Asayama et al. |
| 2004/0057853 A1 | 3/2004 | Ross et al. |
| 2004/0086398 A1 | 5/2004 | Eugene et al. |
| 2005/0089427 A1 | 4/2005 | Riley et al. |
| 2005/0104469 A1 | 5/2005 | Zepp et al. |
| 2005/0156556 A1 | 7/2005 | Hermann et al. |
| 2006/0056979 A1 | 3/2006 | Yoo et al. |
| 2006/0127252 A1 | 6/2006 | Caddell |
| 2006/0162549 A1 | 7/2006 | Wang |
| 2006/0257271 A1 | 11/2006 | Juterbock et al. |
| 2006/0292016 A1 | 12/2006 | Hitter et al. |
| 2007/0092385 A1 | 4/2007 | Petrie |
| 2007/0236089 A1 | 10/2007 | Okubo |
| 2007/0272075 A1 | 11/2007 | Nathan |
| 2008/0179982 A1 | 7/2008 | Kramer |
| 2008/0286120 A1 | 11/2008 | Noord |
| 2009/0097987 A1 | 4/2009 | Sung et al. |
| 2009/0108712 A1 | 4/2009 | Holtzapple et al. |
| 2009/0196771 A1 | 8/2009 | Juterbock et al. |
| 2010/0045096 A1 | 2/2010 | Schonlau et al. |
| 2010/0178184 A1 | 7/2010 | Simmons et al. |
| 2010/0196176 A1 | 8/2010 | Kaufmann et al. |
| 2011/0133485 A1 | 6/2011 | Gieras et al. |
| 2011/0138949 A1 | 6/2011 | Himmelmann |
| 2011/0163704 A1 | 7/2011 | Wang et al. |
| 2011/0236236 A1 | 9/2011 | Larsen et al. |
| 2012/0000561 A1 | 1/2012 | Schuttermair et al. |
| 2012/0063925 A1 | 3/2012 | Parker |
| 2012/0065457 A1 | 3/2012 | Peters et al. |
| 2012/0119599 A1 | 5/2012 | Calley et al. |
| 2012/0227389 A1 | 9/2012 | Hinderks |
| 2012/0291920 A1 | 11/2012 | Grisley |
| 2013/0008538 A1 | 1/2013 | Schutze |
| 2013/0015733 A1 | 1/2013 | Rasch et al. |
| 2013/0039789 A1 | 2/2013 | Donado-Munoz |
| 2013/0078123 A1 | 3/2013 | Fukasaku et al. |
| 2013/0078125 A1 | 3/2013 | Headley et al. |
| 2013/0101445 A1 | 4/2013 | Schuetze |
| 2013/0183173 A1 | 7/2013 | Kohli et al. |
| 2013/0233421 A1 | 9/2013 | Furet et al. |
| 2013/0243630 A1 | 9/2013 | Simmons et al. |
| 2013/0256426 A1 | 10/2013 | Becker et al. |
| 2014/0034754 A1 | 2/2014 | Thompson et al. |
| 2014/0219819 A1 | 8/2014 | Roman et al. |
| 2014/0260746 A1 | 9/2014 | Sakaguchi et al. |
| 2015/0048712 A1 | 2/2015 | Janecek et al. |
| 2015/0226192 A1 | 8/2015 | Hines et al. |
| 2015/0226205 A1 | 8/2015 | Hines et al. |
| 2015/0226206 A1 | 8/2015 | Hines et al. |
| 2015/0226207 A1 | 8/2015 | Hines et al. |
| 2015/0266192 A1 | 9/2015 | Coresh |
| 2016/0001624 A1 | 1/2016 | Meissner et al. |
| 2016/0377065 A1 | 12/2016 | Parker |
| 2017/0067455 A1 | 3/2017 | Reukers et al. |
| 2017/0149304 A1 | 5/2017 | Li et al. |
| 2017/0198690 A1 | 7/2017 | Johnston et al. |
| 2018/0106244 A1 | 4/2018 | Wang et al. |
| 2018/0223817 A1 | 8/2018 | Turner et al. |
| 2019/0203705 A1 * | 7/2019 | Whitehead ............ F04B 49/065 |
| 2020/0248682 A1 | 8/2020 | Reukers et al. |
| 2020/0291936 A1 | 9/2020 | Brocker et al. |
| 2021/0301819 A1 | 9/2021 | Reynolds et al. |

FOREIGN PATENT DOCUMENTS

| | | | |
|---|---|---|---|
| CN | 2262110 Y | 9/1997 |
| CN | 2473348 Y | 1/2002 |
| CN | 1714236 A | 12/2005 |
| CN | 1298990 C | 2/2007 |
| CN | 201041118 Y | 3/2008 |
| CN | 201189501 Y | 2/2009 |
| CN | 101617162 A | 12/2009 |
| CN | 201827066 U | 5/2011 |
| CN | 102202802 A | 9/2011 |
| CN | 102947593 A | 2/2013 |
| CN | 103298564 A | 9/2013 |
| CN | 103397997 A * | 11/2013 |
| CN | 103814213 A | 5/2014 |
| CN | 105121867 A | 12/2015 |
| CN | 105673378 A | 6/2016 |
| CN | 106369126 A * | 2/2017 |
| DE | 4300512 A1 | 7/1994 |
| DE | 102004063032 A1 | 7/2006 |
| DE | 102010018145 A1 | 10/2011 |
| EP | 0781922 A1 | 7/1997 |
| EP | 0799672 A1 | 10/1997 |
| EP | 3299622 A1 | 3/2018 |
| EP | 3502470 A1 | 6/2019 |
| EP | 3530940 A1 | 8/2019 |
| FR | 2681646 A1 | 3/1993 |
| GB | 1408095 A | 10/1975 |
| JP | 2000145577 A | 5/2000 |
| JP | 2004210544 A | 7/2004 |
| JP | 2005098135 A | 4/2005 |
| JP | 2006029302 A | 2/2006 |
| JP | 2006291957 A | 10/2006 |
| JP | 2007500821 A | 1/2007 |
| JP | 2011220223 A | 11/2011 |
| KR | 200296106 Y1 | 11/2002 |
| TW | 200606337 A | 2/2006 |
| WO | 9012962 A1 | 11/1990 |
| WO | 03022257 A2 | 1/2003 |
| WO | 2006037671 A1 | 4/2006 |
| WO | 2009076429 A2 | 6/2009 |
| WO | WO2010066754 A1 | 6/2010 |
| WO | 2011162822 A2 | 12/2011 |
| WO | 2012034238 A1 | 3/2012 |
| WO | 2012125790 A2 | 9/2012 |

(56) References Cited

FOREIGN PATENT DOCUMENTS

| WO | 2015127497 A1 | 9/2015 |
| WO | 2016100197 A1 | 6/2016 |
| WO | 2016100707 A1 | 6/2016 |

OTHER PUBLICATIONS

International Preliminary Report on Patentability for PCT Application No. PCT/US2021/025132, Dated Oct. 13, 2022, pp. 14.
International Search Report and Written Opinion for PCT Application No. PCT/US2021/025132, Dated Aug. 12, 2021, pp. 22.
Invitation to Pay Additional Fees for PCT Application No. PCT/US2021/025132, Dated Jun. 21, 2021, pp. 15.
International Preliminary Report on Patentability for PCT Application No. PCT/US2021/025086, Dated Oct. 13, 2022, pp. 19.
International Preliminary Report on Patentability for PCT Application No. PCT/US2021/025121, Dated Oct. 13, 2022, pp. 11.
International Preliminary Report on Patentability for PCT Application No. PCT/US2021/025133, Dated Oct. 13, 2022, pp. 7.
International Preliminary Report on Patentability for PCT Application No. PCT/US2021/025129, Dated Oct. 13, 2022, pp. 10.
International Search Report and Written Opinion for PCT Application No. PCT/US2021/025086, Dated Aug. 31, 2021, pp. 25.
International Search Report and Written Opinion for PCT Application No. PCT/US2021/025121, Dated Jul. 5, 2021, pp. 20.
International Search Report and Written Opinion for PCT Application No. PCT/US2021/025129, Dated Jul. 8, 2021, pp. 18.
Invitation to Pay Additional Fees for PCT Application No. PCT/US2021/025121, Dated May 14, 2021, pp. 15.
Invitation to Pay Additional Fees for PCT Application No. PCT/US2021/025129, Dated May 17, 2021, pp. 24.
Motorcontroltips.com: Halbach array What is it and how is it used in electric motors pdf from motioncontroltips.com/what-is-halbach-array-and-how-is-it-used-in-electric-motors/ (Year:2021).
International Search Report and Written Opinion for PCT Application No. PCT/US2021/025133, Dated Jun. 4, 2021, pp. 12, 12.
Invitation to Pay Additional Fees for PCT Application No. PCT/US2021/025086, Dated Jul. 7, 2021, pp. 18.

* cited by examiner

ELECTRICALLY OPERATED PUMP FOR A PLURAL COMPONENT SPRAY SYSTEM

CROSS-REFERENCE TO RELATED APPLICATION(S)

This application is a national phase application of PCT Application No. PCT/US2021/025132, which claims the benefit of U.S. Provisional Application No. 63/002,685 filed Mar. 31, 2020, and entitled "ELECTRICALLY OPERATED PUMP FOR A PLURAL COMPONENT SPRAY SYSTEM," the disclosures of which are hereby incorporated by reference in their entireties.

BACKGROUND

This disclosure relates generally to plural component dispensing systems and more particularly to drive systems for pumps within plural component dispensing systems.

Multiple component (e.g., fluid) applicators often include dispensing systems that receive separate inert material components, mix the components according to a predetermined ratio, and then dispense the components as an activated compound. For example, multiple component applicators are often used to dispense epoxies and polyurethanes that solidify after mixing of a resin component and an activating material, which are individually inert. After mixing, an immediate chemical reaction begins that results in the cross-linking, curing, and solidification of the mixture. Therefore, the two components are routed separately in the system so that they can remain segregated for as long as possible. A dispensing device, such as a sprayer or other device, receives each component after it is pumped separately and mixes the components for delivery as an activated compound. A typical multiple component applicator system includes positive displacement pumps that individually draw component materials from separate hoppers and pump the pressurized component materials (e.g., fluids) to the dispensing device for mixing and application.

SUMMARY

According to one aspect of the disclosure, a pumping system for a plural component spray system configured to receive first and second component materials and output a plural component material includes an electric motor including a stator and a rotor configured to rotate about a pump axis, a drive mechanism directly connected to the rotor and configured to convert a rotational output from the rotor to a linear input, a first piston of a first pump coupled to the drive mechanism to be reciprocated axially by the drive mechanism, and a second piston of a second pump coupled to the drive mechanism to be reciprocated axially by the drive mechanism.

According to another aspect of the disclosure, a method of operating a pumping system configured to pump different first and second component materials to an applicator for mixing and forming a plural component material includes driving rotation of a rotor of an electric motor about a pump axis by a stator of the electric motor; driving, by rotation of the rotor, a screw disposed coaxially with the rotor in a first axial direction and a second axial direction; driving reciprocation of a first piston of a first pump in the first axial direction and the second axial direction thereby pumping a first component material; and driving a second piston of a second pump in the first axial direction and the second axial direction thereby pumping a second component material different than the first component material.

According to yet another aspect of the disclosure, a pumping system for a plural component spray system configured to receive first and second component materials and output a plural component material includes an electric motor including a stator and a rotor, the rotor configured to rotate about a motor axis; a drive mechanism directly connected to the rotor and configured to convert a rotational output from the rotor to a linear input; a yoke connected to the drive mechanism to be reciprocated axially by the drive mechanism; a first piston of a first pump coupled to the yoke to be reciprocated axially; and a second piston of a second pump coupled to the yoke to be reciprocated axially.

According to yet another aspect of the disclosure, a pumping assembly includes a motor including a stator and a rotor, the rotor configured to rotate on a motor axis; a first piston of a first pump coupled to the rotor to be reciprocated axially; a second piston of a second pump coupled to the rotor to be reciprocated axially; and a controller configured to control operation of the motor such that the first and second pistons displace according to a first speed profile during a fill stroke and according to a second speed profile during a pressure stroke, the first speed profile different than the second speed profile. The first piston and the second piston are disposed such that the first piston and the second piston simultaneously proceed through respective fill strokes and pressure strokes

DETAILED DESCRIPTION

Figure 1A:
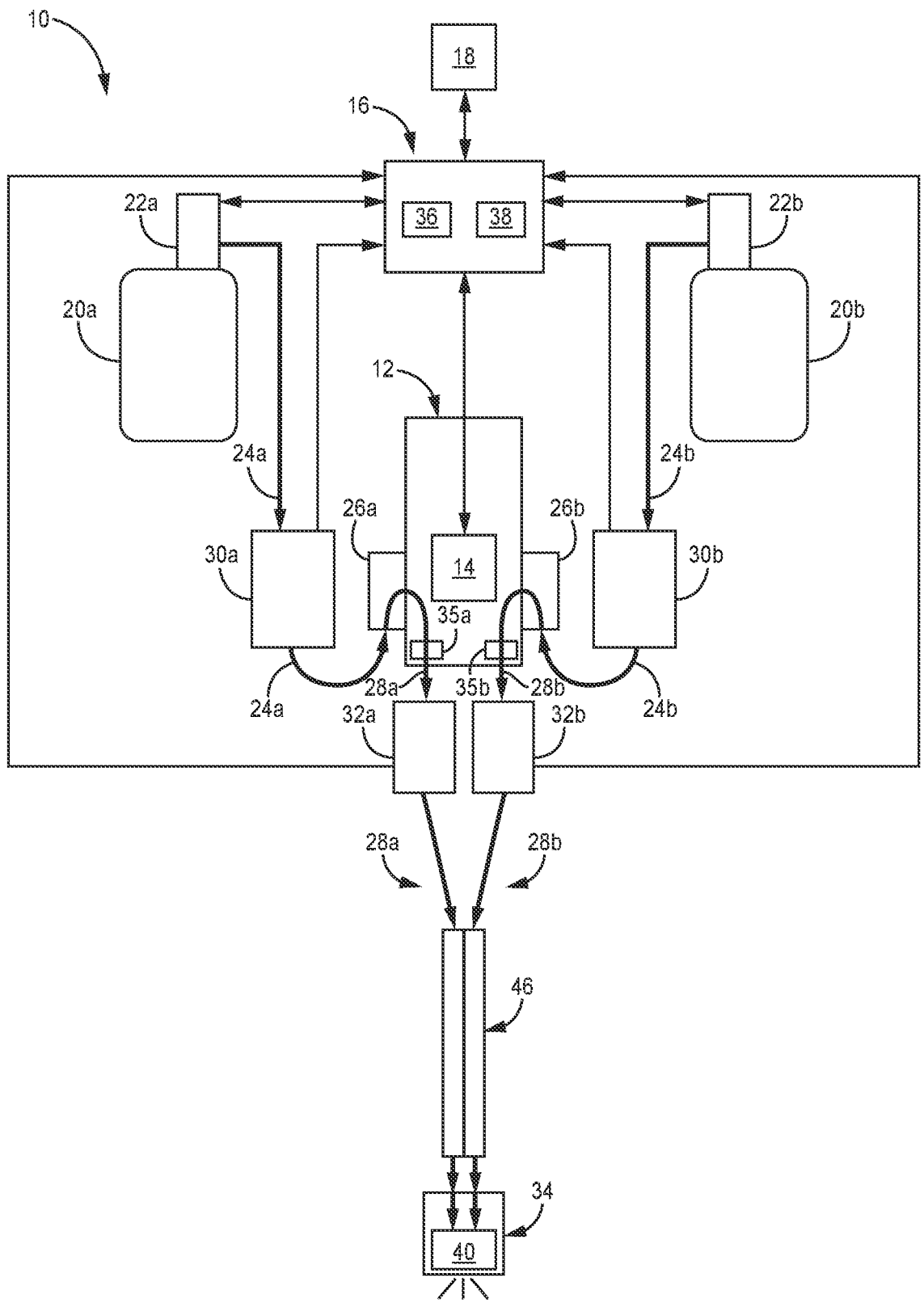
FIG. 1A is a block schematic diagram of a plural component system.
Figure 1B:
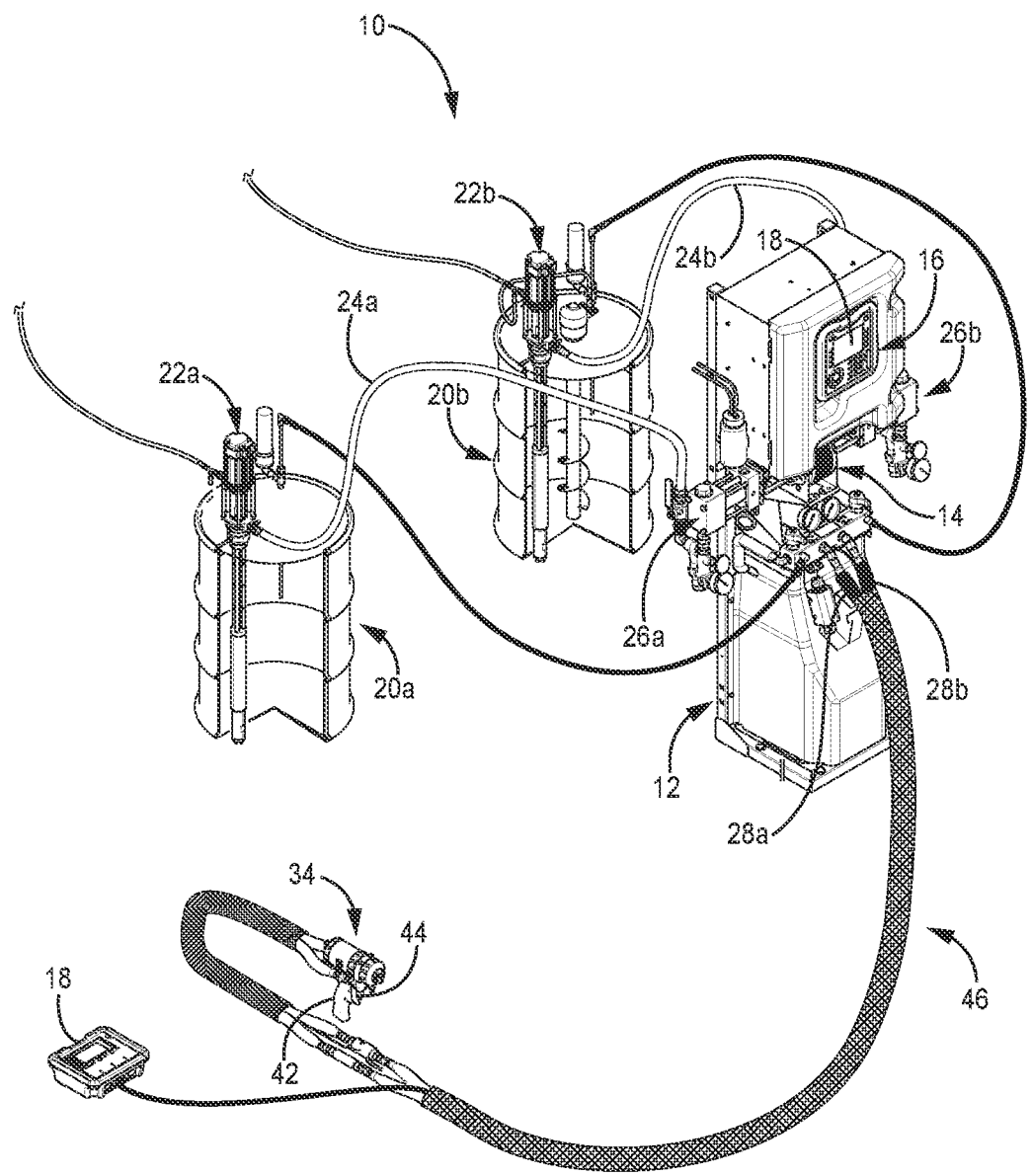
FIG. 1B is an isometric view of the plural component system of FIG. 1A.

FIG. 1A is a block schematic diagram of system 10. FIG. 1B is an isometric view of system 10. FIGS. 1A and 1B will be discussed together. Proportioner 12; motor 14; controller 16; user interface 18; fluid tanks 20a, 20b; feed pumps 22a, 22b; feed lines 24a, 24b; proportioner pumps 26a, 26b; supply lines 28a, 28b; upstream sensors 30a, 30b; downstream sensors 32a, 32b; and applicator 34 are shown. Proportioner 12 includes primary heaters 35a, 35b. Controller 16 includes memory 36 and control circuitry 38. Applicator 34 includes mixer 40, handle 42, and trigger 44. Heated portion 46 of supply lines 28a, 28b is shown.

Spray system 10 is a system configured to pump a first component material and second component material to applicator 34 to form a spray material. The component materials are pumped according to target parameters, such as ratio, temperature, and/or pressure. The first and second component materials are mixed at applicator 34 to form the spray material that is sprayed onto a substrate by applicator 34. For example, one of the first and second component materials can be a catalyst, such as isocyanate, and the other one of the first and second component materials can be a resin, such as polyol resin, that combine to form the plural component spray material, such as a spray foam.

Fluid tanks 20a, 20b hold the individual component materials during spraying. In some examples, fluid tanks 20a, 20b are portable and can be moved between job sites. In some examples, fluid tanks 20a, 20b can be drums, such as 55-gallon drums, among other options.

Feed pumps 22a, 22b are respectively mounted to fluid tanks 20a, 20b. Feed lines 24a, 24b respectively extend from feed pumps 22a, 22b to proportioner pumps 26a, 26b. Feed pumps 22a, 22b draw the first and second component materials from fluid tanks 20a, 20b and pump the component materials through feed lines 24a, 24b to proportioner pumps 26a, 26b. Feed pumps 22a, 22b provide the component materials to proportioner pumps 26a, 26b under pressure. In some examples, feed pumps 22a, 22b are configured to pump the component materials to proportioner pumps 26a, 26b at pressures of at least about 0.35 Megapascal (MPa) (about 50 pounds per square inch (psi)). In some examples, feed pumps 22a, 22b are configured to pump the component materials at pressures of up to about 1.75 MPa (about 250 psi). Feed pumps 22a, 22b provide the component materials to proportioner pumps 26a, 26b under pressure to fill proportioner pumps 26a, 26b during pumping, preventing proportioner pumps 26a, 26b from starving. Feeding proportioner pumps 26a, 26b under pressure prevents the component materials from being pumped downstream at a ratio other than the target ratio due to insufficient fill of proportioner pumps 26a, 26b. Feed pumps 22a, 22b can be of any desired configuration suitable for pumping the component materials to proportioner pumps 26a, 26b under pressure, such as pneumatic, hydraulic, or electric pumps.

Proportioner 12 supports various components of system 10. In some examples, controller 16 is supported by proportioner 12. Proportioner 12 can further support proportioner pumps 26a, 26b and motor 14.

Proportioner pumps 26a, 26b receive the first and second component materials from feed pumps 22a, 22b and pump the individual component materials downstream to applicator 34. Proportioner pumps 26a, 26b increase the pressure of the first and second component materials from the feed pressure to a spray pressure. The spray pressure is greater than the feed pressure generated by feed pumps 22a, 22b. In some examples, proportioner pumps 26a, 26b can pump the component materials at pressures between about 3.4 MPa (about 500 psi) and about 35.5 MPa (about 5000 psi). In some examples, proportioner pumps 26a, 26b can pump the component materials at pressures between about 10.3 MPa (about 1500 psi) and about 25.6 MPa (about 4000 psi). In some examples, proportioner pumps 26a, 26b are configured to pump at pressures between about 11.7 MPa (1700 psi) and about 24.1 megapascal (MPa) (about 3500 pounds per square inch (psi)).

Motor 14 is mechanically connected to both proportioner pump 26a and proportioner pump 26b. Motor 14 and proportioner pumps 26a, 26b can be considered as forming a pumping assembly of proportioner 12. Motor 14 is an electric motor having a stator and a rotor. The rotor is configured to rotate about a pump axis in response to current (such as a direct current (DC) signals and/or alternating current (AC) signals) through the stator. Motor 14 can be a reversible motor such that the rotor can be rotated in either one of two rotational directions. Motor 14 is connected to proportioner pumps 26a, 26b such that motor 14 simultaneously causes displacement of the fluid displacement members of each of proportioner pumps 26a, 26b. Proportioner pumps 26a, 26b are disposed on opposite lateral sides of motor 14. In some examples, proportioner pumps 26a, 26b can be considered as extending horizontally form motor 14.

Primary heaters 35a, 35b are configured to increase temperatures of the first and second component materials, respectively, to an operating temperature above the ambient temperature during spraying. Primary heaters 35a, 35b can be disposed in proportioner 12. Primary heaters 35a, 35b can be disposed downstream from proportioner pumps 26a, 26b such that the output from each proportioner pump 26a, 26b flows through primary heaters 35a, 35b. Supply lines 28a, 28b respectively extend from proportioner pumps 26a, 26b to applicator 34. Heated portion 46 of supply lines 28a, 28b includes heating elements configured to further increases and/or maintain the elevated temperature of the first and second component materials. The heated portion 46 of supply lines 28a, 28b can also be referred to as a heated hose. In some examples, primary heaters 35a, 35b and heated portion 46 can be configured to raise and/or maintain the temperature to at least about 37.8 degrees C. (about 100 degrees F.). In some examples, primary heaters 35a, 35b and heated portion 46 can be configured to operate at temperatures up to about 82 degrees C. (about 180 degrees F.). Maintaining the first and second component materials at elevated temperatures facilitates proper mixing and the formation of desired material characteristics in the spray material.

Applicator 34 receives the first and second component materials from supply lines 28a, 28b. The first and second component materials are mixed in mixer 40, which is connected to and, in some examples, disposed within applicator 34. The component materials mix within mixer 40 to form the plural component spray material. Mixer 40 is the first location within system 10 where the first and second component materials mix. The first and second component materials are isolated from each other at all locations upstream of mixer 40. The spray material is ejected through a spray orifice of applicator 34 and applied to the substrate. For example, the user can grasp handle 42 and actuate trigger 44 to cause spraying by applicator 34.

Upstream sensors 30a, 30b are disposed upstream of proportioner pumps 26a, 26b respectively. Upstream sensors 30a, 30b are disposed between feed pumps 22a, 22b and proportioner pumps 26a, 26b. Upstream sensors 30a, 30b can be disposed proximate the inlets of proportioner pumps 26a, 26b. Upstream sensors 30a, 30b are parameter sensors configured to generate data regarding parameters of the component materials feeding proportioner pumps 26a, 26b. For example, upstream sensors 30a, 30b can include any one or more of pressure sensors, flow rate sensors, and temperature sensors, among other options. Upstream sensors 30a, 30b are configured to provide the parameter data to controller 16.

Downstream sensors 32a, 32b are disposed downstream of proportioner pumps 26a, 26b respectively. Downstream sensors 32a, 32b are disposed between proportioner pumps 26a, 26b and applicator 34. Downstream sensors 32a, 32b can be disposed proximate the outlets of proportioner pumps 26a, 26b. Downstream sensors 32a, 32b are parameter sensors configured to generate data regarding parameters of the component materials exiting proportioner pumps 26a, 26b and flowing through supply lines 28a, 28b. For example, downstream sensors 32a, 32b can include any one or more of pressure sensors, flow rate sensors, and temperature sensors, among other options. In some examples, pressure and flow rate sensors of downstream sensors 32a, 32b are disposed proximate the outlets of proportioner pumps 26a, 26b and temperature sensors of downstream sensors 32a, 32b are disposed within heated portion 46.

Controller 16 is configured to store software, implement functionality, and/or process instructions. Controller 16 is configured to perform any of the functions discussed herein, including receiving an output from any sensor referenced herein, detecting any condition or event referenced herein, and controlling operation of any components referenced herein. Controller 16 can be of any suitable configuration for controlling operation of the pumps within system 10, gathering data, processing data, etc. Controller 16 can include hardware, firmware, and/or stored software, and controller 16 can be entirely or partially mounted on one or more boards. Controller 16 can be of any type suitable for operating in accordance with the techniques described herein. While controller 16 is illustrated as a single unit, it is understood that controller 16 can be disposed across one or more boards. In some examples, controller 16 can be implemented as a plurality of discrete circuitry subassemblies.

Controller 16 is operatively connected to motor 14, either electrically or communicatively, to control pumping by proportioner pumps 26a, 26b. In some examples, controller 16 is operatively connected to feed pumps 22a, 22b, either electrically or communicatively, to control pumping by feed pumps 22a, 22b. Controller 16 can be connected to motor 14 and feed pumps 22a, 22b via either wired or wireless connections to provide commands to and cause operation of feed pumps 22a, 22b and motor 14. Controller 16 is operatively connected to upstream sensors 30a, 30b and downstream sensors 32a, 32b, either electrically or communicatively. Controller 16 can be connected to upstream sensors 30a, 30b and downstream sensors 32a, 32b by either wired or wireless connections. Controller 16 receives data regarding the sensed parameters for the first component material and second component material from upstream sensors 30a, 30b and downstream sensors 32a, 32b. Controller 16 can control operation of one or both of motor 14 and feed pumps 22a, 22b based on the data received from any one or more of upstream sensors 30a, 30b and downstream sensors 32a, 32b.

Memory 36 is configured to store software that, when executed by control circuitry 38, controls operation of motor 14. For example, control circuitry 38 can include one or more of a microprocessor, a controller, a digital signal processor (DSP), an application specific integrated circuit (ASIC), a field-programmable gate array (FPGA), or other equivalent discrete or integrated logic circuitry. Memory 36, in some examples, is described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, memory 36 is a temporary memory, meaning that a primary purpose of memory 36 is not long-term storage. Memory 36, in some examples, is described as volatile memory, meaning that memory 36 does not maintain stored contents when power to controller 16 is turned off. Examples of volatile memories can include random access memories (RAM), dynamic random access memories (DRAM), static random access memories (SRAM), and other forms of volatile memories. Memory 36, in one example, is used by software or applications running on control circuitry 38 to temporarily store information during program execution. Memory 36, in some examples, also includes one or more computer-readable storage media. Memory 36 can further be configured for long-term storage of information. Memory 36 can be configured to store larger amounts of information than volatile memory. In some examples, memory 36 includes non-volatile storage elements. Examples of such non-volatile storage elements can include magnetic hard discs, optical discs, floppy discs, flash memories, or forms of electrically programmable memories (EPROM) or electrically erasable and programmable (EEPROM) memories.

User interface 18 can be any graphical and/or mechanical interface that enables user interaction with controller 16. For example, user interface 18 can implement a graphical user interface displayed at a display device of user interface 18 for presenting information to and/or receiving input from a user. User interface 18 can include graphical navigation and control elements, such as graphical buttons or other graphical control elements presented at the display device. User interface 18, in some examples, includes physical navigation and control elements, such as physically actuated buttons or other physical navigation and control elements. In general, user interface 18 can include any input and/or output devices and control elements that can enable user interaction with controller 16.

During operation, the first and second component materials are pumped to applicator 34 from fluid tanks 20a, 20b by feed pumps 22a, 22b and proportioner pumps 26a, 26b and are mixed at applicator 34 to form the plural component spray material. Flows of the first component material and the second component material to the applicator 34 are controlled based on one or more target operating parameters, such as fluid ratio, pressure, and temperature. Controller 16 controls operation of motor 14 based on at least one of the target operating parameters. The electric current to motor 14 provides the pressure output by proportioner pumps 26a, 26b. Controlling the flow based on the target operating parameters generates a spray material having desired material properties, such as porosity, expansion rate, expansion volume, thermal resistivity, etc. Spraying according to the target operating parameters further provides an even spray pattern, fine droplet size, adequate flow, and good mixing. Spraying according to the target operating parameters further prevents excessive overspray, undesirably high flow rates, difficult control, and excessive wear.

Controller 16 controls electric signals which can be referred to as current, voltage, or power, to motor 14 to cause proportioner pumps 26a, 26b to pump the component materials at the target output parameter (e.g., pressure and/or flow rate). It is understood that a reference to the term "current" can be replaced with a different measure of power such as voltage or the term "power" itself. Controller 16 can be configured to operate proportioner pumps 26a, 26b at or below a maximum operating pressure, flow rate, and/or current. Controller 16 can control the current provided to motor 14 based on parameter data received from downstream sensors 32a, 32b.

To apply the spray material, the user manipulates applicator 34 by grasping handle 42. The user depresses trigger 44 to cause flow through applicator 34 and mixing within mixer 40. The upstream pressures generated by proportioner pumps 26a, 26b drive the component materials through mixer 40, causing mixing of the component materials within mixer 40 to form the spray material. The pressures upstream of applicator 34 drive the material out through the orifice of applicator 34 to cause spraying by applicator 34. As such, proportioner pumps 26a, 26b drive the component materials through mixer 40 and generate the spray ejected from applicator 34.

Feed pump 22a draws the first component material from fluid tank 20a and pumps the first component material through feed line 24a to proportioner pump 26a. Upstream sensor 30a generates data regarding one or more operating parameters of the first component material and provides that data to controller 16. Feed pump 22b draws the second component material from fluid tank 20b and pumps the second component material through feed line 24b to proportioner pump 26b. Upstream sensor 30b generates data regarding one or more operating parameters of the second component material and provides that data to controller 16.

Electric current is provided to motor 14 to cause rotation of the rotor of motor 14. The rotor drives linear displacement of the fluid displacement members of proportioner pumps 26a, 26b, as discussed in more detail below. Motor 14 simultaneously drives proportioner pumps 26a, 26b, causing proportioner pumps 26a, 26b to simultaneously pump the first and second component materials downstream to applicator 34. Proportioner pumps 26a, 26b can be double displacement pumps, such that proportioner pumps 26a, 26b output fluid during both strokes of a pump cycle. Controller 16 controls the electric current flow to motor 14 to control pumping by proportioner pumps 26a, 26b and control the downstream pressure generated by proportioner pumps 26a, 26b. Downstream sensors 32a, 32b generate parameter data regarding the individual component material in each of supply lines 28a, 28b, respectively. Controller 16 can adjust the current provided to motor 14 based on the parameter data received from one or both of downstream sensors 32a, 32b to maintain the downstream operating parameter at the target spray level for that parameter.

Primary heaters 35a, 35b increase the temperatures of the materials emitted by proportioner pumps 26a, 26b. The component materials are pumped downstream through supply lines 28a, 28b between proportioner pumps 26a, 26b and applicator 34. Heated portion 46 maintains the temperature of the materials flowing through supply lines 28a, 28b at temperatures above ambient. Heating the component materials reduces the viscosity of the component materials and enhances mixing to cause the formation of desired characteristics in the spray material. The first and second component materials combine within mixer 40 of applicator 34 to form the spray material that is sprayed from applicator 34 onto the substrate.

The user can depress and release trigger 44 multiple times during any spray job. The user releasing trigger 44 deadheads proportioner pumps 26a, 26b, meaning that the flowpaths through supply lines 28a, 28b are closed and material is not flowing downstream from proportioner pumps 26a, 26b. Controller 16 is configured to control current flow to motor 14 both when proportioner pumps 26a, 26b are actively pumping and when proportioner pumps 26a, 26b are stalled.

In a stalled state, the rotor can apply torque to power proportioner pumps 26a, 26b, but the rotor does not rotate about its axis such that proportioner pumps 26a, 26b are not displacing material. The fluid displacement members of proportioner pumps 26a, 26b apply force to the component materials with the rotor applying torque, generating downstream pressure within supply lines 28a, 28b without displacing axially along pump axis PA-PA (FIGS. 2A-3B). The check valves of proportioner pumps 26a, 26b further maintain the pressure in supply lines 28a, 28b. Proportioner pumps 26a, 26b can continue to apply pressure to the component materials when proportioner pumps 26a, 26b are stalled. Proportioner pumps 26a, 26b resume pumping once the downstream pressure falls below the pumping pressure, such as when the user actuates trigger 44 and resumes spraying. Continuing to apply power to motor 14 during a stall provides quick reaction when the user resumes spraying, as proportioner pumps 26a, 26b can begin pumping as soon as the downstream pressure drops, increasing spray efficiency and avoiding undesired pressure loss. In some examples, controller 16 can reduce or stop current flow to motor 14 while in the stalled state, to conserve energy and reduce heat generation. Controller 16 can increase the current to cause proportioner pumps 26a, 26b to resume pumping at the target operating current based on downstream sensors 32a, 32b indicating a drop in the downstream pressure.

System 10 provides significant advantages. Controller 16 can precisely control the pressure output by proportioner pumps 26a, 26b by controlling current flow to motor 14. The user can control the downstream pressure by simply setting a target spray pressure. Controller 16 controls operation of motor 14 based on feedback from downstream sensor 32a, 32b to achieve the target spray pressure. As such, unlike a hydraulic or pneumatic drive, the user is not required to adjust the pressure at the motor such as by a series of knobs to set the downstream pressure. Instead, controller 16 adjusts the current flow to motor 14 to maintain the desired spray parameter. Motor 14 simultaneously drives the fluid displacement members of each proportioner pump 26a, 26b to provide simultaneous pumping by proportioner pumps 26a, 26b. The simultaneous pumping provides the individual component materials downstream according to the desired ratio. Motor 14 further causes proportioner pumps 26a, 26b to generate the downstream spray pressure while in a stalled state. Maintaining the downstream pressure in the stalled state causes quick reaction when the user resumes spraying, avoiding sputtering and other undesirable spray characteristics that can occur due to pressure drops.

Figure 2A:
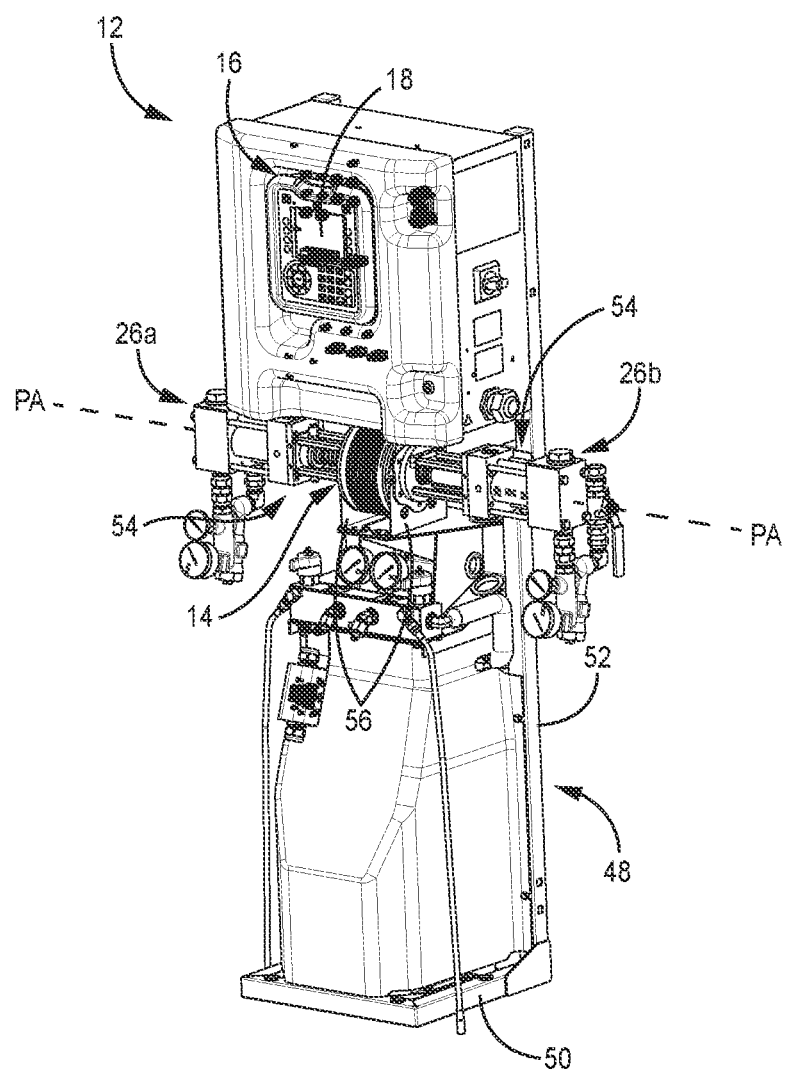
FIG. 2A is an isometric view of a proportioner for a plural component pumping system.
Figure 2B:
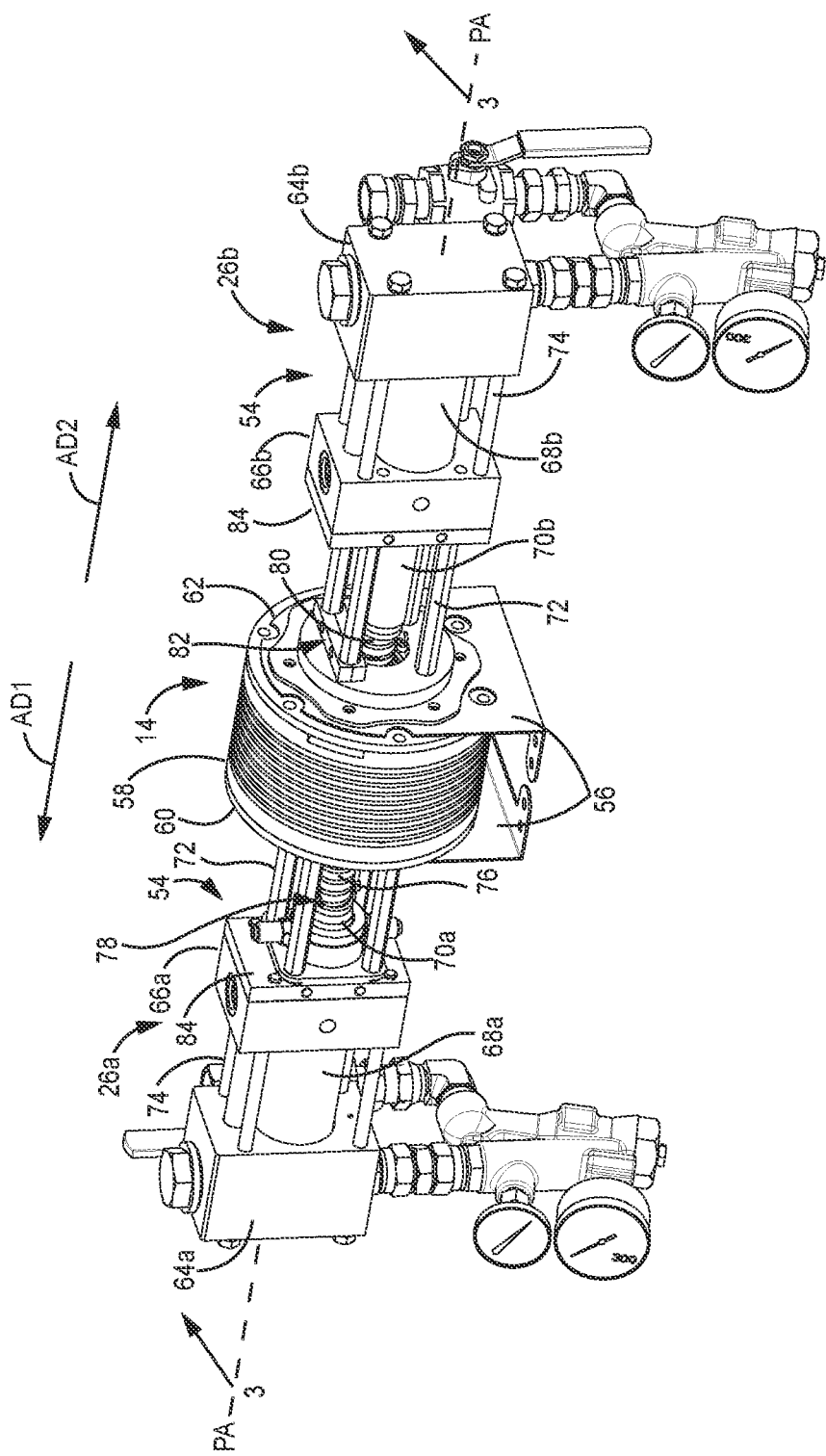
FIG. 2B is an enlarged view of detail B in FIG. 2A.

FIG. 2A is an isometric view of proportioner 12. FIG. 2B is an enlarged view of a pumping assembly formed by motor 14 and proportioner pumps 26a, 26b shown in FIG. 2A. FIGS. 2A and 2B are discussed together. Proportioner 12, motor 14, controller 16, user interface 18, and proportioner pumps 26a, 26b are shown. Frame 48 supporting components of proportioner 12 includes base portion 50, vertical portion 52, pump supports 54, and motor bracket 56. Housing 58, first axial end 60, and second axial end 62 of motor 14 are shown. Proportioner pumps 26a, 26b respectively include inlet housings 64a, 64b; outlet housings 66a, 66b; pump cylinders 68a, 68b; and pistons 70a, 70b. Pump supports 54 include inner rods 72 and outer rods 74. Screw 76 is shown and includes first end 78 and second end 80. Anti-rotation element 82 is shown.

Proportioner 12 is configured for use in a plural component pumping system, such as system 10 (FIG. 1). The plural component pumping system can be utilized to generate and apply spray foam, among other options. Proportioner 12 supports control components of the system and supports pumping components of the system.

Frame 48 supports various components of proportioner 12 and the system. Base portion 50 supports other components of proportioner 12. Base portion 50 rests on a support surface, such as the ground or the bed of a truck. Base portion 50 can be fixed or not fixed to the support surface. Proportioner 12 can be moved between job sites and to different locations within a single job site. Vertical portion 52 extends generally vertically from base portion 50.

Motor 14 is fixed to frame 48 such that motor 14 is fixed relative to pump axis PA-PA during operation. Motor bracket 56 is fixed to housing 58 and frame 48. Motor bracket 56 fixes motor 14 relative frame 48 and aligns motor 14 on pump axis PA-PA. Motor bracket 56 can be formed from one or more components supporting motor 14 relative to frame 48. For example, motor bracket 56 can include plates connected motor 14 and frame 48. In the example shown, motor bracket 56 includes a first plate disposed at first axial end 60 of motor 14 and a second plate disposed at second axial end 62 of motor 14.

Proportioner pump 26a extends axially from first axial end 60 of motor 14. Proportioner pump 26a extends in first axial direction AD1 from motor 14. Proportioner pump 26b extends axially from second axial end 62 of motor 14. Proportioner pump 26b extends in second axial direction AD2 from motor 14. Proportioner pumps 26a, 26b are disposed coaxially with motor 14 on pump axis PA-PA. Proportioner pumps 26a, 26b extend horizontally from motor 14. Motor 14 is disposed axially between proportioner pumps 26a, 26b.

Proportioner pumps 26a, 26b are supported by frame 48 and motor 14. Inner rods 72 extend between motor 14 and support plates 84 to support proportioner pumps 26a, 26b relative motor 14. Outlet housings 66a, 66b are connected to support plates 84. One or both of support plates 84 and outlet housings 66a, 66b can be fixed to frame 48, such as by fixing to vertical portion 52. In some examples, a support plate 84 is integrated into and formed with each outlet housing 66a, 66b. Pump cylinders 68a, 68b extend axially between outlet housings 66a, 66b and inlet housings 64a, 64b, respectively. Outer rods 74 extend between outlet housings 66a, 66b and inlet housings 64a, 64b and are disposed around pump cylinders 68a, 68b. Proportioner pumps 26a, 26b are cantilevered with inlet housings 64a, 64b forming the free ends of cantilevered proportioner pumps 26a, 26b.

Screw 76 is disposed coaxially with motor 14 on pump axis PA-PA and extends axially through motor 14. Screw 76 is driven linearly along pump axis PA-PA by rotation of the rotor, as discussed in more detail below. Piston 70a of proportioner pump 26a is connected to first end 78 of screw 76, and piston 70b is of proportioner pump 26b is connected to second end 80 of screw 76. Reciprocation of screw 76 drives pistons 70a, 70b through respective pump cycles to cause pumping of the component materials.

Anti-rotation element 82 engages inner rods 72 to prevent screw 76 from rotating about axis PA-PA during operation. In the example shown, anti-rotation element 82 engages two of inner rods 72. In the example shown, anti-rotation element is a clamshell formed from multiple components extending around and engaging inner rods 72. Anti-rotation element 82 can be connected to reciprocate with screw 76 and pistons 70a, 70b along pump axis PA-PA. In some examples, anti-rotation element 82 is disposed on one axial side of motor 14. As such, motor 14 can be disposed axially between one of proportioner pumps 26a, 26b and anti-rotation element 82.

During operation, motor 14 drives pistons 70a, 70b of each proportioner pump 26a, 26b through respective pump cycles to pump first and second component materials. The first and second component materials are different materials configured to combine to form a plural component spray material having desired material properties, such as a spray foam. The pistons 70a, 70b are connected to motor 14 by screw 76 and driven axially by motor 14. Pistons 70a, 70b of proportioner pumps 26a, 26b simultaneously translate in the first axial direction AD1 and in the second axial direction AD2.

Figure 3A:
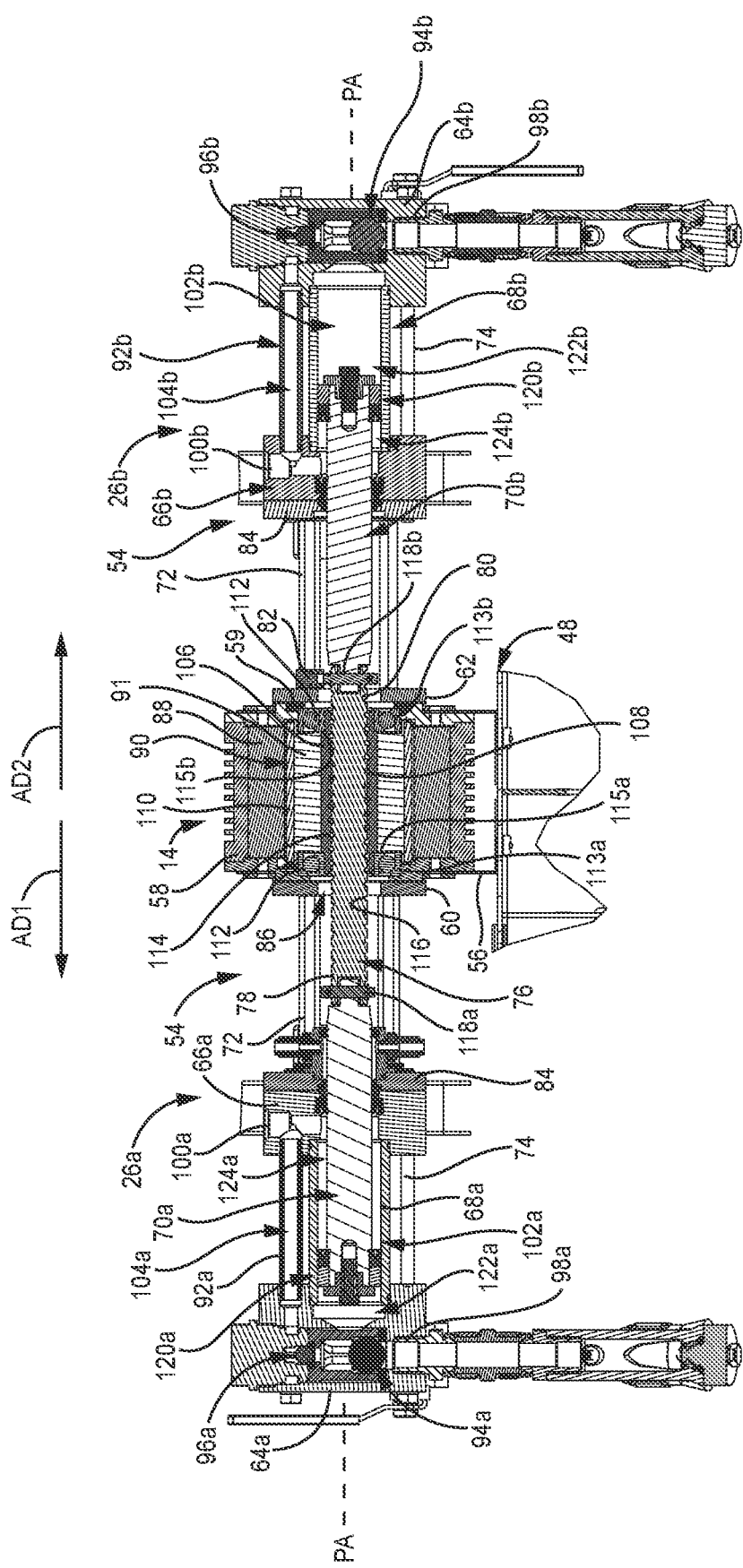
FIG. 3A is a cross-sectional view taken along line 3-3 in FIG. 2B showing proportioner pumps displaced in a first stroke direction.
Figure 3B:
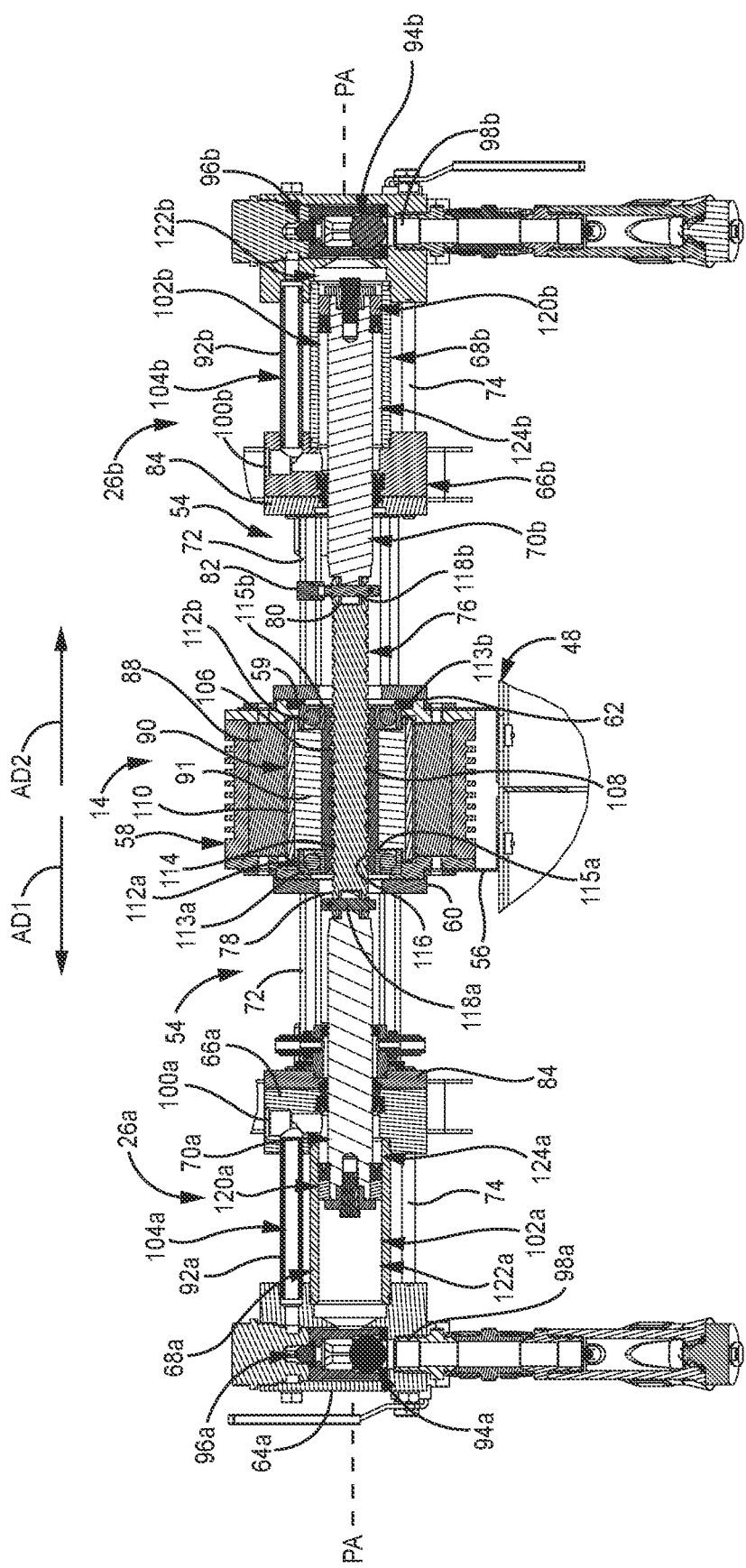
FIG. 3B is a cross-sectional view taken along line 3-3 in FIG. 2B showing proportioner pumps displaced in a second stroke direction.

FIG. 3A is a cross-sectional view a cross-sectional view taken along line 3-3 in FIG. 2B showing proportioner pumps 26a, 26b at the end of a stroke in first axial direction AD1. FIG. 3B is a cross-sectional view taken along line 3-3 in FIG. 2B showing proportioner pumps 26a, 26b at an end of a stroke in second axial direction AD1. Motor 14; proportioner pumps 26a, 26b; frame 48, motor bracket 56, and drive mechanism 86 are shown. Motor 14 includes motor housing 58, end nut 59, first axial end 60, and second axial end 62, stator 88, and rotor 90. Rotor 90 includes rotor body 91 and permanent magnet array 110. Proportioner pumps 26a, 26b respectively include inlet housings 64a, 64b; outlet housings 66a, 66b; pump cylinders 68a, 68b; pistons 70a, 70b; transfer tubes 92a, 92b; inlet valves 94a, 94b; outlet valves 96a, 96b; inlets 98a, 98b; outlets 100a, 100b; pumping chambers 102a, 102b; and transfer passages 104a, 104b. Drive mechanism 86 includes screw 76, drive nut 106, and rolling elements 108. Screw 76 includes first end 78, second end 80, and screw thread 116. Drive nut 106 includes nut thread 114.

Motor 14 is an electric motor having stator 88 and rotor 90. Stator 88 includes armature windings (not shown) and rotor 90 includes permanent magnet array 110. Rotor 90 is configured to rotate about pump axis PA-PA in response to power through stator 88. Motor 14 can be a reversible motor in that stator 88 can cause rotor 90 to rotate in either of two rotational directions. Rotor 90 is connected to the pistons 70a, 70b via drive mechanism 86, which receives a rotary output from rotor 90 and provides a linear input to pistons 70a, 70b.

Drive nut 106 is disposed within and connected to rotor 90 to rotate with rotor 90 about pump axis PA-PA. Drive nut 106 is mounted to bearings 112a, 112b at opposite axial ends of drive nut 90. In some examples, bearings 112a, 112b are configured to react both rotational and thrust loads. In some examples, bearings 112a, 112b are roller bearings. For example, bearings 112a, 112b can be tapered roller bearings, among other options. An outer race 113a of bearing 112a interfaces with rotor body 91 and housing 56. For example, outer race 113a can interface with a shoulder formed on each of rotor body 91 and housing 56. An inner race 115a of bearing 112a interfaces with drive nut 106 and can interface with a portion of rotor body 91. For example, inner race 115a can interface with a shoulder formed on drive nut 106. An outer race 113b of bearing 112b interfaces with rotor body 91 and end nut 59. For example, outer race 113b can interface with a shoulder formed on rotor body 91 and a shoulder formed on end nut 59. An inner race 115b of bearing 112b interfaces with drive nut 106 and can interface with a portion of rotor body 91. For example, inner race 115b can interface with a shoulder formed on drive nut 106. End nut 59 is mounted to housing 58 and interfaces with bearing 112b. End nut 59 preloads each of bearings 112a, 112b. End nut 59 can be removably mounted to housing 58, such as by interfaced threading. Screw 76 extends through drive nut 106 and is connected to each piston 70a, 70b. Screw 76 reciprocates along pump axis PA-PA to drive pistons 70a, 70b through respective pump strokes.

Rolling elements 108 are disposed between rotor 90 and screw 76. More specifically, rolling elements 108 are disposed between drive nut 106 and screw 76. Rolling elements 108 can be of any configuration suitable for causing linear displacement of screw 76 based on rotation of drive nut 106. For example, rolling elements 108 can be formed by balls or elongate rollers, among other options. Rolling elements 108 engage screw thread 116 to drive linear displacement of screw 76 along pump axis PA-PA. In some examples, rolling elements 108 are disposed in raceways formed by opposing nut thread 114 and screw thread 116. Rolling elements 108 are disposed circumferentially about screw 76 and evenly arrayed around screw 76. Rolling elements 108 separate drive nut 106 and screw 76 such that drive nut does not directly contact screw 76. Instead, both drive nut 106 and screw 76 ride on rolling elements 108. Rolling elements 108 maintain gap 109 (FIG. 5) between drive nut 106 and screw 76.

Proportioner pumps 26a, 26b are disposed on opposite axial sides of motor 14. Proportioner pump 26a extends in first axial direction AD1 away from motor 14 and proportioner pump 26b extends in second axial direction AD2 away from motor 14. Proportioner pump 26a is substantially similar to proportioner pump 26b. Piston 70a extends through outlet housing 66a and into pumping chamber 102a. Piston 70a is disposed on pump axis PA-PA and is configured to reciprocate on pump axis PA-PA. Piston 70b is disposed on pump axis PA-PA and is configured to reciprocate on pump axis PA-PA. Piston 70b is coaxial with rotor 90. Piston 70a is coaxial with piston 70b. It is understood that proportioner pumps 26a, 26b can be of different configurations to provide the first and second component materials at a desired ratio. For example, if a 2:1 ratio of the first component material to the second component material is desired, then proportioner pump 26a can be sized to have twice the displacement of proportioner pump 26b. Proportioner pumps 26a, 26b can be sized in any desired manner to provide the component materials at the desired ratio. In some examples, bypass valves associated with proportioner pumps 26a, 26b can be opened to allow a portion of the component material flow to recirculate to fluid tanks 20a, 20b (FIGS. 1A and 1B), thereby allowing the user to set a downstream ratio.

Piston 70a is connected to first end 78 of screw 76. In the example shown, piston 70a is connected to first end 78 by pin 118a extending through screw 76 and piston 70a. A portion of piston 70a extends into a bore formed in first end 78 of screw 76. As such, screw 76 at least partially axially overlaps with piston 70a. The portion of screw 76 axially overlapping piston 70a can be disposed radially around piston 70a. Piston 70b is connected to second end 80 of screw 76. In the example shown, piston 70b is connected to second end 80 by pin 118b extending through screw 76 and piston 70b. A portion of piston 70b extends into a bore formed in second end 80 of screw 76. As such, screw 76 at least partially axially overlaps with piston 70b. The portion of screw 76 axially overlapping piston 70b can be disposed radially around piston 70b.

Pin 118b can further secure anti-rotation element 82 at the interface between piston 70b and screw 76. Anti-rotation element 82 engages pump support 54 to prevent rotation of screw 76. Anti-rotation element 82 can translate axially with screw 76.

While pistons 70a, 70b are described as connecting to screw 76 by pinned connections, it is understood that pistons 70a, 70b can connect to screw 76 in any desired manner, such as by screwing into first end 78 and second end 80 of screw 76 to engage with screw 76 by interfaced threading. Drive mechanism 86 is directly connected to rotor 90 and pistons 70a, 70b are directly driven by drive mechanism 86. As such, motor 14 directly drives pistons 70a, 70b without the presence of intermediate gearing, such as speed reduction gearing.

Piston 70a is coaxial with rotor 90. Piston head 120a divides pumping chamber 102a into an upstream chamber 122a and a downstream chamber 124a. Inlet valve 94a is disposed in inlet housing 64a. Inlet valve 94a is a one-way valve configured to allow fluid to flow into inlet housing 64a and upstream chamber 122a while preventing retrograde flow through inlet 98a. Inlet valve 94a is a normally closed valve. Outlet valve 96a is disposed in inlet housing 64a. Outlet valve 96a is disposed between upstream chamber 122a and transfer passage 104a. Outlet valve 96a is a one-way valve configured to allow fluid to flow from upstream chamber 122a to transfer passage 104a while preventing retrograde flow to upstream chamber 122a. Outlet valve 96a is a normally closed valve.

Transfer tube 92a extends between and is mounted to each of inlet housing 64a and outlet housing 66a. Transfer tube 92a defines transfer passage 104a. While transfer tube 92a is described as a separate component, it is understood that transfer tube 92a can be integrated into pump cylinder 68a such that each of transfer passage 104a and pumping chamber 102a are defined by pump cylinder 68a. Transfer tube 92a is spaced radially from pump cylinder 68a. Transfer tube 92a is disposed downstream of outlet valve 96a. Transfer tube 92a extends generally axially. Transfer passage 104a is spaced radially from pump axis PA-PA. Transfer passage 104a provides a flowpath for fluid to flow to downstream chamber 124a.

Each of inlet valve 94a and outlet valve 96a can be oriented transverse to pump axis PA-PA such that fluid flow through each of inlet valve 94a and outlet valve 96a is along axes transverse to pump axis PA-PA. In some examples, one or both of inlet valve 94a and outlet valve 96a are disposed orthogonal to pump axis PA-PA. In some examples, both inlet valve 94a and outlet valve 96a are disposed on the same axial side of piston head 120a, disposed on the same axial side of both upstream chamber 122a and downstream chamber 124a, and/or configured to remain stationary relative to piston head 120a during operation. In some examples, neither inlet valve 94a nor outlet valve 96a overlap axially with piston 70a at any point along the stroke of piston 70a. Piston 70a can be disposed axially between motor 14 and inlet valve 94a throughout a pump cycle of piston 70a. Piston 70a can be disposed axially between motor 14 and outlet valve 96a throughout a pump cycle of piston 70a.

Piston 70b extends through outlet housing 66b and into pumping chamber 102b. Piston head 120b divides pumping chamber 102b into an upstream chamber 122b and a downstream chamber 124b. Inlet valve 94b is disposed in inlet housing 64b. Inlet valve 94b is a one-way valve configured to allow fluid to flow into inlet housing 64b and upstream chamber 122b while preventing retrograde flow through inlet 98b. Inlet valve 94b is a normally closed valve. Outlet valve 96b is disposed in inlet housing 64b. Outlet valve 96b is disposed between upstream chamber 122b and transfer passage 104b. Outlet valve 96b is a one-way valve configured to allow fluid to flow from upstream chamber 122b to transfer passage 104b while preventing retrograde flow to upstream chamber 122b. Outlet valve 96b is a normally closed valve.

Transfer tube 92b extends between and is mounted to each of inlet housing 64b and outlet housing 66b. Transfer tube 92b defines transfer passage 104b. While transfer tube 92b is described as a separate component, it is understood that transfer tube 92b can be integrated into pump cylinder 68b such that each of transfer passage 104b and pumping chamber 102b are defined by pump cylinder 68b. Transfer tube 92b is spaced radially from pump cylinder 68b. Transfer tube 92b is disposed downstream of outlet valve 96b. Transfer tube 92b extends generally axially. Transfer passage 104b is spaced radially from pump axis PA-PA. Transfer passage 104b provides a flowpath for fluid to flow to downstream chamber 124b.

In the example shown, each of inlet valve 94b and outlet valve 96b are oriented transverse to pump axis PA-PA, such that fluid flow through each of inlet valve 94b and outlet valve 96b is along axes transverse to pump axis PA-PA. In some examples, one or both of inlet valve 94b and outlet valve 96b are disposed orthogonal to pump axis PA-PA. Each of inlet valve 94b and outlet valve 96b are disposed on the same axial side of piston head 120b. In some examples, neither of inlet valve 94b and outlet valve 96b overlap axially with piston 70b throughout operation. In some examples, neither of inlet valve 94b and outlet valve 96b overlap axially with piston 70b at any point during operation. Piston 70b can be disposed axially between motor 14 and inlet valve 94b throughout a pump cycle of piston 70b. Piston 70b can be disposed axially between motor 14 and outlet valve 96b throughout a pump cycle of piston 70b.

During operation, current is provided to stator 88 to drive rotation of rotor 90 about pump axis PA-PA. The rotation of rotor 90 drives rotation of drive nut 106 about pump axis PA-PA due to the connection between drive nut 106 and rotor 90. Rolling elements 108 exert forces on screw 76 at screw thread 116 due to the rotation of drive nut 106 to cause axial displacement of screw 76 along pump axis PA-PA. Rotor 90 can be driven in a first rotational direction to drive screw 76 in first axial direction AD1. Rotor 90 can be driven in a second rotational direction opposite the first rotational direction to drive screw 76 in second axial direction AD2 opposite first axial direction AD1.

By way of example, a full pump cycle is discussed in more detail. Starting from the position shown in FIG. 3B, motor 14 is powered and rotor 90 rotates in a first rotational direction about pump axis PA-PA. Rotor 90 causes drive mechanism 86 to rotate in the first rotational direction, thereby displacing screw 76 in first axial direction AD1. Screw 76 drives each of pistons 70a, 70b in the first axial direction AD1 from the positions shown in FIG. 3B to the positions shown in FIG. 3A. Piston 70a is driven through a first stroke of the pump cycle of proportioner pump 26a and piston 70b is driven through a second stroke of the pump cycle of proportioner pump 26b.

Screw 76 drives piston 70a axially through pumping chamber 102a during the first stroke of proportioner pump 26a, reducing the volume of upstream chamber 122a, increasing pressure in upstream chamber 122a, increasing the volume of downstream chamber 124a, and decreasing pressure in downstream chamber 124a. Inlet valve 94a is normally closed and the increased pressure in upstream chamber 122a further maintains inlet valve 94a in the closed state. The increased pressure in upstream chamber 122a and the decreased pressure in downstream chamber 124a cause outlet valve 96a to shift to an open state. The material in upstream chamber 122a is driven through outlet valve 96a and transfer passage 104a. A portion of the material flows downstream from proportioner pump 26a through outlet 100a and another portion flows into downstream chamber 124a to prime proportioner pump 26a for a return stroke.

Screw 76 drives piston 70b axially through pumping chamber 102b during the second stroke of proportioner pump 26b, increasing the volume of upstream chamber 122b, decreasing pressure in upstream chamber 122b, decreasing the volume of downstream chamber 124b, and increasing pressure in downstream chamber 124b. The decreased pressure in upstream chamber 122b generates suction that causes inlet valve 94b to shift to an open state. With inlet valve 94b in the open state, material is drawn into upstream chamber 122b through inlet 98b and inlet valve 94b, priming proportioner pump 26b for a return stroke. Outlet valve 96b is normally closed and the increased pressure in downstream chamber 124b maintains outlet valve 96b in the closed state. The material in downstream chamber 124b is driven downstream from proportioner pump 26b through outlet 100b.

After completing the stroke in the first axial direction AD1, rotor 90 displaces screw 76 in second axial direction AD2. Screw 76 drives each of pistons 70a, 70b in the second axial direction AD2 from the positions shown in FIG. 3A to the positions shown in FIG. 3B. Piston 70a is driven through a second stroke of the pump cycle of proportioner pump 26a and piston 70b is driven through a first stroke of the pump cycle of proportioner pump 26b. The second stroke of proportioner pump 26a is substantially similar to the second stroke of proportioner pump 26b. Piston 70a draws material into upstream chamber 122a through inlet valve 94a and pumps material downstream from downstream chamber 124a through outlet 100a. The first stroke of proportioner pump 26b is substantially similar to the first stroke of proportioner pump 26a. Piston 70b drives the material from upstream chamber 122b through outlet valve 96b and to transfer passage 104. A portion of the material flows downstream through outlet 100b and another portion flows into downstream chamber 124b to prime proportioner pump 26b. Each one of proportioner pumps 26a, 26b is a double displacement pump in that each of proportioner pumps 26a, 26b pump the material downstream through the respective outlets 100a, 100b during each stroke of the respective pump cycles.

Motor 14 driving proportioner pumps 26a, 26b provides significant advantages. Motor 14 links pistons 70a, 70b for simultaneous reciprocation causing proportioner pumps 26*a*, 26*b* to simultaneously output fluid. The pressures output by proportioner pumps 26*a*, 26*b* are based on the current provided to motor 14. Motor 14 provides precision pressure control by controlling the current provided to motor 14. Anti-rotation element 82 prevents rotation of screw 76 about pump axis PA-PA, causing reciprocation of screw 76 relative motor 14.

Figure 4A:
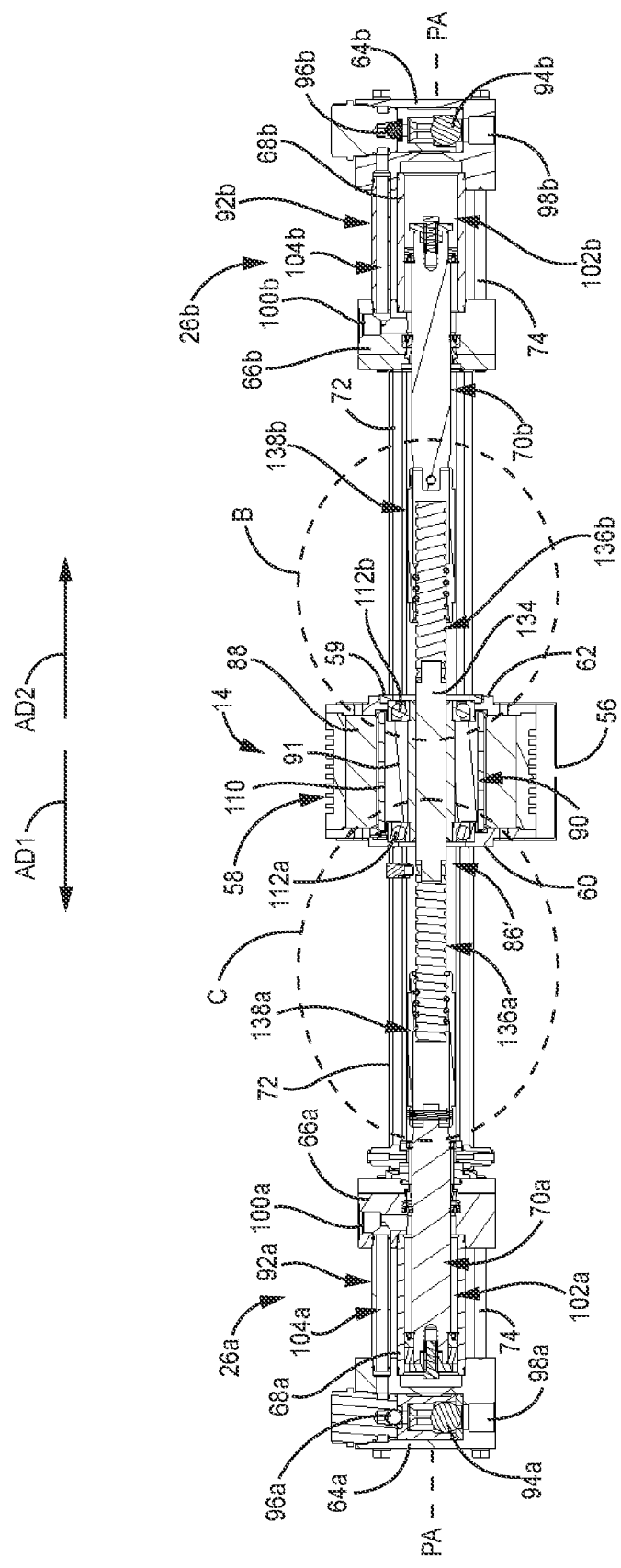
FIG. 4A is a cross-sectional view showing a second embodiment of a driving assembly for proportioner pumps.
Figure 4B:
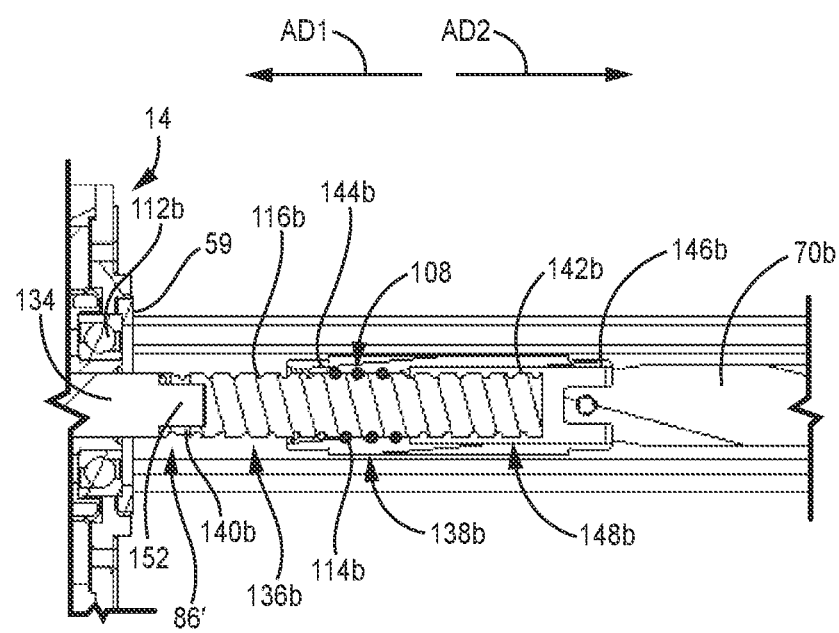
FIG. 4B is an enlarged view of detail B in FIG. 4A.
Figure 4C:
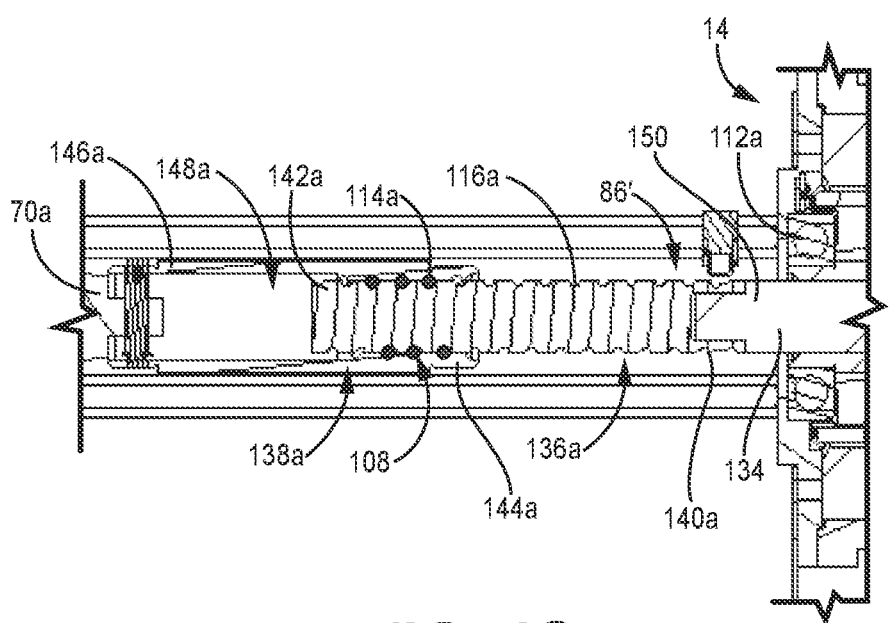
FIG. 4C is an enlarged view of detail C in FIG. 4A.

FIG. 4A is a cross-sectional view of motor 14 and proportioner pumps 26*a*, 26*b*. FIG. 4B is an enlarged view of detail B in FIG. 4A. FIG. 4C is an enlarged view of detail C in FIG. 4A. FIGS. 4A-4C will be discussed together. Motor 14; proportioner pumps 26*a*, 26*b*; motor bracket 56, and drive mechanism 86' are shown. Motor 14 includes motor housing 58, end nut 59, first axial end 60, and second axial end 62, stator 88, and rotor 90. Rotor 90 includes rotor body 91 and permanent magnet array 110. Proportioner pumps 26*a*, 26*b* respectively include inlet housings 64*a*, 64*b*; outlet housings 66*a*, 66*b*; pump cylinders 68*a*, 68*b*; pistons 70*a*, 70*b*; transfer tubes 92*a*, 92*b*; inlet valves 94*a*, 94*b*; outlet valves 96*a*, 96*b*; inlets 98*a*, 98*b*; outlets 100*a*, 100*b*; pumping chambers 102*a*, 102*b*; and transfer passages 104*a*, 104*b*.

Drive mechanism 86' includes drive shaft 134; screws 136*a*, 136*b*; driven nuts 138*a*, 138*b*; and rolling elements 108. Screws 136*a*, 136*b* respectively include screw threads 116*a*, 116*b*; inner screw ends 140*a*, 140*b*; and outer screw ends 142*a*, 142*b*. Driven nuts 138*a*, 138*b* respectively include nut threads 114*a*, 114*b*; inner nut ends 144*a*, 144*b*; outer nut ends 146*a*, 146*b*; and nut cavities 148*a*, 148*b*. Drive shaft 134 includes first shaft end 150 and second shaft end 152.

Motor 14 is an electric motor having stator 88 and rotor 90. Stator 88 includes armature windings (not shown) and rotor 90 includes permanent magnet array 110. Rotor 90 is configured to rotate about pump axis PA-PA in response to power through stator 88. Motor 14 is a reversible motor in that stator 88 can cause rotor 90 to rotate in either of two rotational directions. Rotor 90 is connected to the pistons 70*a*, 70*b* by drive mechanism 86'. Drive mechanism 86' receives a rotary output from rotor 90 and provides a linear input to pistons 70*a*, 70*b*.

Drive shaft 134 is disposed within and connected to rotor 90 to rotate with rotor 90 about pump axis PA-PA. Drive shaft 134 can be connected to rotor body 91 in any desired manner, such as by fasteners, adhesive, or press-fitting, among other options. In some example, drive shaft 134 can be formed as part of rotor body 91. For example, rotor body 91 can include axial projections that screws 136*a*, 136*b* are connected to.

Drive shaft 134 is mounted to bearings 112*a*, 112*b* at opposite axial ends of drive shaft 134. In some examples, bearings 112*a*, 112*b* are configured to react both rotational and thrust loads. In some examples, bearings 112*a*, 112*b* are roller bearings. For example, bearings 112*a*, 112*b* can be tapered roller bearings, among other options. An outer race 113*a* of bearing 112*a* interfaces with rotor body 91 and housing 56. For example, outer race 113*a* can interface with a shoulder formed on each of rotor body 91 and housing 56. An inner race 115*a* of bearing 112*a* interfaces with drive shaft 134 and can interface with a portion of rotor body 91. For example, inner race 115*a* can interface with a shoulder formed on drive shaft 134. An outer race 113*b* of bearing 112*b* interfaces with rotor body 91 and end nut 59. For example, outer race 113*b* can interface with a shoulder formed on rotor body 91 and a shoulder formed on end nut 59. An inner race 115*b* of bearing 112*b* interfaces with drive shaft 134 and can interface with a portion of rotor body 91. For example, inner race 115*b* can interface with a shoulder formed on drive shaft 134. End nut 59 is mounted to housing 58 and interfaces with bearing 112*b*. End nut 59 preloads each of bearings 112*a*, 112*b*. End nut 59 can be removably mounted to housing 58, such as by interfaced threading. Drive shaft 134 extends axially beyond the axial ends of rotor 90. The axial end of drive shaft 134 extending in second axial direction AD2 extends through driven nut 106.

Screw 136*a* is connected to first shaft end 150 of drive shaft 134. Screw 136*b* is connected to second shaft end 152 of drive shaft 134. Motor 14 is disposed axially between screw 136*a* and screw 136*b*. Screw 136*a*, drive shaft 134, and screw 136*b* are disposed coaxially on pump axis PA-PA. Screws 136*a*, 136*b* are fixed to drive shaft 134 such that screws 136*a*, 136*b* rotate with drive shaft 134. Screws 136*a*, 136*b* are configured to rotate on pump axis PA-PA. Driven nuts 138*a*, 138*b* are connected to screws 136*a*, 136*b*, respectively, to provide linear driving force to pistons 70*a*, 70*b*. Screws 136*a*, 136*b* can be substantially similar to screw 76 (best seen in FIGS. 3A and 3B), except screws 136*a*, 136*b* rotate during operation to form the rotating components of drive mechanism 86' and provide the rotational output from rotor 90. Driven nuts 138*a*, 138*b* can be substantially similar to drive nut 106 (best seen in FIGS. 3A and 3B), except driven nuts 138*a*, 138*b* do not rotate about pump axis PA-PA and are instead driven linearly along pump axis PA-PA due to the rotation of screws 136*a*, 136*b*. As such, driven nuts 138*a*, 138*b* form the linear drive elements of drive mechanism 86' to provide the linear driving force to pistons 70*a*, 70*b*.

Screw 136*a* extends in first axial direction AD1 from drive shaft 134. Inner screw end 140*a* is connected to drive shaft 134. Inner screw end 140*a* can be connected to drive shaft 134 in any desired manner, such as by fasteners, adhesive, or press-fitting, among other options. Outer screw end 142*a* is disposed at an opposite axial end of screw 136*a* from inner screw end 140*a*. Screw thread 116*a* is formed on screw 136*a*.

Driven nut 138*a* is operably connected to screw 136*a* such that rotation of screw 136*a* causes linear displacement of driven nut 138*a* along pump axis PA-PA. Screw 136*a* is configured to rotate relative to driven nut 138*a*. Driven nut 138*a* is disposed coaxially with screw 136*a* on pump axis PA-PA. Inner nut end 144*a* extends around screw 136*a* and includes nut thread 114*a* formed on a radially inner face of driven nut 138*a*. While nut thread 114*a* is shown as extending a portion of the axial length of driven nut 138*a*, it is understood that nut thread 114*a* can extend any desired amount of the axial length of driven nut 138*a*, including up to the full axial length of driven nut 138*a*. Outer nut end 146*a* is connected to piston 70*a*. In the example shown, outer nut end 146*a* is connected to piston 70*a* by a pinned connection. It is understood, however, that driven nut 138*a* and piston 70*a* can be connected in any manner suitable for transferring an axial driving force from driven nut 138*a* to piston 70*a*, such as by adhesive, interfaced threading, or press-fitting, among other options. In some examples, driven nut 138*a* can be integrally formed with piston 70*a*. Nut cavity 148*a* is formed within driven nut 138*a*. In some examples, nut cavity 148*a* is open at each axial end of driven nut 138*a*. Piston 70*a* can extend into nut cavity 148*a* to connect to driven nut 138*a*. Outer screw end 142*a* can translate within nut cavity 148*a* during operation. In some examples, outer screw end 142*a* is free within nut cavity 148*a* such that screw 136*a* does not contact the walls defining nut cavity 148*a*.

Rolling elements 108 can be disposed between driven nut 138*a* and screw 136*a*. Rolling elements 108 can be of any configuration suitable for causing linear displacement of driven nut 138*a* based on rotation of screw 136*a*. For example, rolling elements 108 can be formed by balls or elongate rollers, among other options. Rolling elements 108 engage nut thread 114*a* to drive linear displacement of driven nut 138*a* along pump axis PA-PA. In some examples, rolling elements 108 are disposed in raceways formed by opposing nut thread 114*a* and screw thread 116*a*. Rolling elements 108 are disposed circumferentially about screw 136*a* and evenly arrayed around screw 136*a*. Rolling elements 108 separate driven nut 138*a* and screw 136*a* such that driven nut does not directly contact screw 136*a*. Instead, both driven nut 138*a* and screw 136*a* ride on rolling elements 108. It is understood that, in some examples, screw thread 116*a* can directly engage nut thread 114*a* to drive linear displacement of driven nut 138*a* and piston 70*a*. Such examples may not include rolling elements 108.

Screw 136*b* extends in first axial direction AD2 from drive shaft 134. Inner screw end 140*b* is connected to drive shaft 134. Inner screw end 140*b* can be connected to drive shaft 134 in any desired manner, such as by fasteners, adhesive, or press-fitting, among other options. Outer screw end 142*b* is disposed at an opposite axial end of screw 136*b* from inner screw end 140*b*. Screw thread 116*b* is formed on screw 136*b*.

Driven nut 138*b* is operably connected to screw 136*b* such that rotation of screw 136*b* causes linear displacement of driven nut 138*b* along pump axis PA-PA. Screw 136*b* is configured to rotate relative to driven nut 138*b*. Driven nut 138*b* is disposed coaxially with screw 136*b* on pump axis PA-PA. Inner nut end 144*b* extends around screw 136*b* and includes nut thread 114*b* formed on a radially inner face of driven nut 138*b*. While nut thread 114*b* is shown as extending a portion of the axial length of driven nut 138*b*, it is understood that nut thread 114*b* can extend any desired amount of the axial length of driven nut 138*b*, including up to the full axial length of driven nut 138*b*. Outer nut end 146*b* is connected to piston 70*b*. In the example shown, outer nut end 146*b* is connected to piston 70*b* by a pinned connection. It is understood, however, that driven nut 138*b* and piston 70*b* can be connected in any manner suitable for transferring an axial driving force from driven nut 138*b* to piston 70*b*, such as by adhesive, interfaced threading, or press-fitting, among other options. In some examples, driven nut 138*b* can be integrally formed with piston 70*b*. Nut cavity 148*b* is formed within driven nut 138*b*. In some examples, nut cavity 148*b* is open at each axial end of driven nut 138*b*. Piston 70*b* can extend into nut cavity 148*b* to connect to driven nut 138*b*. Outer screw end 142*b* can translate within nut cavity 148*b* during operation. In some examples, outer screw end 142*b* is free within nut cavity 148*b* such that screw 136*b* does not contact the walls defining nut cavity 148*b*.

Rolling elements 108 can be disposed between driven nut 138*b* and screw 136*b*. Rolling elements 108 can be of any configuration suitable for causing linear displacement of driven nut 138*b* based on rotation of screw 136*b*. For example, rolling elements 108 can be formed by balls or elongate rollers, among other options. Rolling elements 108 engage nut thread 114*b* to drive linear displacement of driven nut 138*b* along pump axis PA-PA. In some examples, rolling elements 108 are disposed in raceways formed by opposing nut thread 114*b* and screw thread 116*b*. Rolling elements 108 are disposed circumferentially about screw 136*b* and evenly arrayed around screw 136*b*. Rolling elements 108 separate driven nut 138*b* and screw 136*b* such that driven nut does not directly contact screw 136*b*. Instead, both driven nut 138*b* and screw 136*b* ride on rolling elements 108. It is understood that, in some examples, screw thread 116*b* can directly engage nut thread 114*b* to drive linear displacement of driven nut 138*b* and piston 70*b*. Such examples may not include rolling elements 108.

Proportioner pumps 26*a*, 26*b* are disposed on opposite axial sides of motor 14. Proportioner pump 26*a* extends in first axial direction AD1 away from motor 14 and proportioner pump 26*b* extends in second axial direction AD2 away from motor 14. Proportioner pump 26*a* is substantially similar to proportioner pump 26*b*. Piston 70*a* extends through outlet housing 66*a* and into pumping chamber 102*a*. Piston 70*a* is disposed on pump axis PA-PA and is configured to reciprocate on pump axis PA-PA. Piston 70*b* is disposed on pump axis PA-PA and is configured to reciprocate on pump axis PA-PA. Piston 70*b* is coaxial with rotor 90. Piston 70*a* is coaxial with piston 70*b*. It is understood that proportioner pumps 26*a*, 26*b* can be of different configurations to provide the first and second component materials at a desired ratio. As discussed in more detail below, screws 136*a*, 136*b* can be of differing configurations to facilitate different flow rates from proportioner pumps 26*a*, 26*b* to provide the desired ratio.

During operation, current is provided to stator 88 to drive rotation of rotor 90 about pump axis PA-PA. The rotation of rotor 90 drives rotation of drive shaft 134 about pump axis PA-PA due to the connection between drive shaft 134 and rotor 90. Rotation of drive shaft 134 causes each of screws 136*a*, 136*b* to rotate in the same rotational direction as drive shaft 134 and rotor 90. Rotation of screw 136*a* exerts an axial driving force on driven nut 138*a* to displace driven nut 138*a* axially along pump axis PA-PA. Driven nut 138*a* displaces piston 70*a* through a stroke due to the connection of driven nut 138*a* and piston 70. Rolling elements 108 exert forces on driven nut 138*a* at nut thread 114*a* due to the rotation of screw 136*a* to cause axial displacement of driven nut 138*a* along pump axis PA-PA. Rotation of screw 136*b* exerts an axial driving force on driven nut 138*b* to displace driven nut 138*b* axially along pump axis PA-PA. Driven nut 138*b* displaces piston 70*b* through a stroke due to the connection of driven nut 138*b* and piston 70. Rolling elements 108 exert forces on driven nut 138*b* at nut thread 114*b* due to the rotation of screw 136*b* to cause axial displacement of driven nut 138*b* along pump axis PA-PA.

In some examples, screws 136*a*, 136*b* are configured such that each of pistons 70*a*, 70*b* are simultaneously driven in first axial direction AD1 and in second axial direction AD2. For example, each of screws 136*a*, 136*b* can have the same of a right-hand or left-hand thread configuration. Rotating screws 136*a*, 136*b* with the same handedness in the same rotational direction causes screws 136*a*, 136*b* to exert axial forces on driven nuts 138*a*, 138*b* in the same axial direction. For example, rotating screw 136*a* in a first rotational direction can cause driven nut 138*a*, and thus piston 70*a*, to displace in first axial direction AD1 and rotating screw 136*b* in that first rotational direction can cause driven nut 138*b*, and thus piston 70*b*, to displace in first axial direction AD1. Rotating screw 136*a* in a second rotational direction can cause driven nut 138*a*, and thus piston 70*a*, to displace in second axial direction AD2 and rotating screw 136*b* in that second rotational direction can cause driven nut 138*b*, and thus piston 70*b*, to displace in second axial direction AD2. Both proportioner pumps 26*a*, 26*b* are double displacement pumps, such that each proportioner pump 26*a*, 26*b* outputs fluid regardless of the stroke direction.

In some examples, screws 136a, 136b are configured such that pistons 70a, 70b are driven in opposite axial directions relative each other. Screws 136a, 136b can have opposing handedness. For example, one of screws 136a, 136b can have a right-hand thread configuration and the other one of screws 136a, 136b can have a left-hand thread configuration. Rotating screws 136a, 136b with opposing handedness in the same rotational direction causes screws 136a, 136b to exert opposing axial forces on driven nuts 138a, 138b. For example, rotating screw 136a in a first rotational direction can cause driven nut 138a, and thus piston 70a, to displace in first axial direction AD1 and rotating screw 136b in that first rotational direction can cause driven nut 138b, and thus piston 70b, to displace in second axial direction AD2. Rotating screw 136a in a second rotational direction can cause driven nut 138a, and thus piston 70a, to displace in second axial direction AD2 and rotating screw 136b in that second rotational direction can cause driven nut 138b, and thus piston 70b, to displace in first axial direction AD1. Both proportioner pumps 26a, 26b are double displacement pumps, such that each proportioner pump 26a, 26b outputs fluid regardless of the stroke direction.

Screws 136a, 136b can further have the same or differing leads (the axial travel for a single revolution). Screws 136a, 136b can have the same lead to cause the same axial displacement distance of each driven nut 138a, 138b per revolution of rotor 90. Screws 136a, 136b can have differing leads to cause different axial displacement distances for each driven nut 138a, 138b per revolution of rotor 90. For example, screws 136a, 136b can be configured to control the output ratio between proportioner pumps 26a, 26b. Assuming proportioner pumps 26a, 26b are sized to have the same fluid displacement per linear travel of piston 70a, 70b, screws 136a, 136b can have the same lead to cause proportioner pumps 26a, 26b to output fluid according to a 1:1 ratio. One of screws 136a, 136b can have a lead that is half that of the other screw 136a, 136b to cause proportioner pumps 26a, 26b to output fluid according to a 2:1 ratio. The lead ratio between screws 136a, 136b can be any desired ratio to provide the desired output ratio for the pumped fluid, such as 1:1, 2:1, 3:1, 4:1, or higher. In some examples, the user can modify the pumping system to provide a different ratio by swapping one set of screws 136a, 136b and driven nuts 138a, 138b for one having a different lead, thereby facilitating the same proportioner pumps 26a, 26b outputting fluid at a different output ratio.

Motor 14 driving proportioner pumps 26a, 26b provides significant advantages. Motor 14 links pistons 70a, 70b for simultaneous reciprocation causing proportioner pumps 26a, 26b to simultaneously output fluid. Screws 136a, 136b can have the same or different handedness to drive pistons 70a, 70b in the same or opposing axial directions. Driving pistons 70a, 70b in opposing axial directions assists in balancing axial pump reaction forces generated during pumping, reducing the axial load on bearings 112a, 112b. Screws 136a, 136b can have different leads to control the output ratio between proportioner pumps 26a, 26b, allowing proportioner pumps 26a, 26b of the same size to output different flows, thereby reducing part counts and facilitating quick and simple changes to change the output ratio. Screws 136a, 136b reciprocate within nut cavities 148a, 148b, thereby providing an axially compact pumping arrangement.

Figure 5:
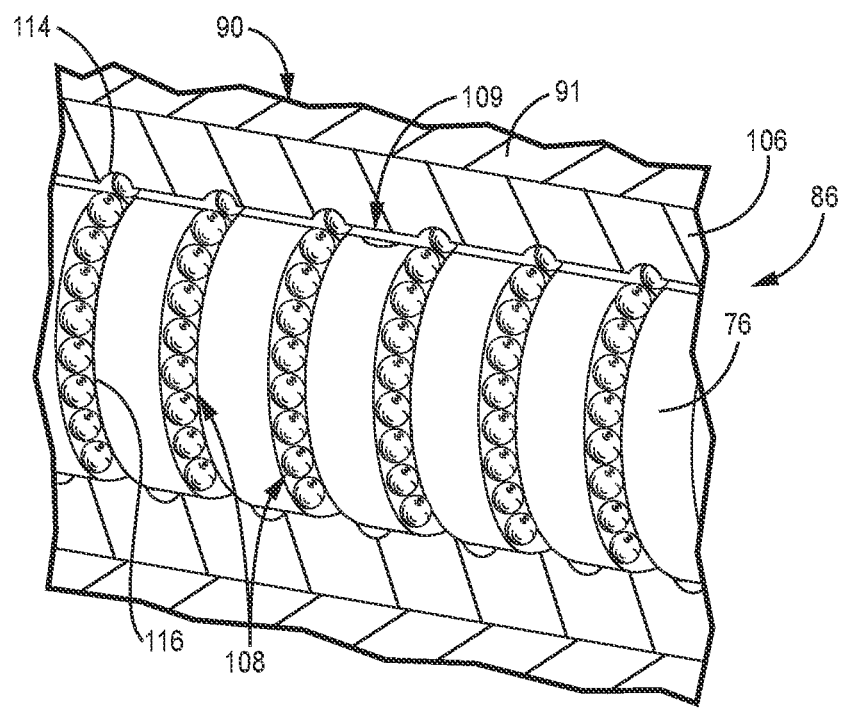
FIG. 5 is an isometric partial cross-sectional view showing a first embodiment of a drive mechanism.

FIG. 5 is an isometric partial cross-sectional view of drive mechanism 86 and rotor 90. Screw 76, drive nut 106, and rolling elements 108 of drive mechanism 86 are shown. Gap 109 is shown. Nut thread 114 and screw thread 116 are shown. While the discussion of FIG. 5 is with regard to drive mechanism 86, it is understood that the discussion can apply equally to the interface between screws 136a, 136b (FIGS. 4A-4C) and driven nuts 138a, 138b (FIGS. 4A-4C).

Drive nut 106 extends through rotor 90 and is disposed coaxially with rotor 90. Drive nut 106 is connected to rotor body 91 of rotor 90 such that drive nut 106 rotates about pump axis PA-PA with rotor 90. Nut thread 114 is formed on an inner radial surface of drive nut 106. Screw 76 extends axially through drive nut 106 and is disposed coaxially with rotor 90 and drive nut 106. Screw thread 116 is formed on an exterior of screw 76.

Rolling elements 108 are disposed in raceways formed by screw thread 116 and nut thread 114. In the example shown, rolling elements 108 are balls. As such, drive mechanism 86 can be considered to be a ball screw. Rolling elements 108 support screw 76 relative drive nut 106 such that each of drive nut 106 and screw 76 ride on rolling elements 108. Rolling elements 108 support screw 76 relative drive nut 106 such that drive nut 106 and screw 76 are not in contact during operation. Drive nut 106 rotates relative to screw 76. Rolling elements 108 exert forces on screw 76 at screw thread 116 due to rotation of drive nut 106 to cause axial displacement of screw 76 along pump axis PA-PA.

Figure 6:
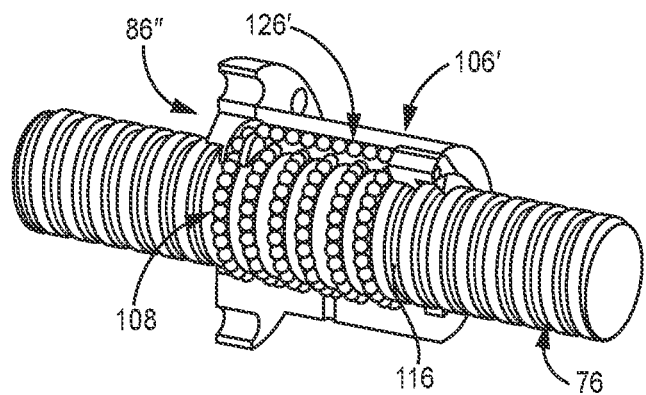
FIG. 6 is an isometric partial cross-sectional view of a drive mechanism.

FIG. 6 is a partial cross-sectional view of drive mechanism 86". Drive mechanism 86" is substantially similar to drive mechanism 86 (best seen in FIG. 5). Drive mechanism 86" includes screw 76, drive nut 106', rolling elements 108, and ball return 126.

Drive nut 106' surrounds a portion of screw 76 and rolling elements 108 are disposed radially between drive nut 106' and screw 76. In the example shown, rolling elements 108 are balls. As such, drive mechanism 86" can be considered to be a ball screw. Rolling elements 108 support drive nut 106' relative screw 76 such that drive nut 106' does not contact screw 76. Rolling elements 108 are disposed in raceways formed by screw thread 116 and nut thread 114 (best seen in FIG. 5). Ball return 126 is configured to pick up rolling elements 108 and recirculate the rolling elements 108 within the raceway formed by screw thread 116 and nut thread 114. Ball return 126 can be of any type suitable for circulating rolling elements 108. In some examples, ball return 126 is an internal ball return such that rolling elements 108 not within raceway pass through the body of drive nut 106'.

Figure 7:
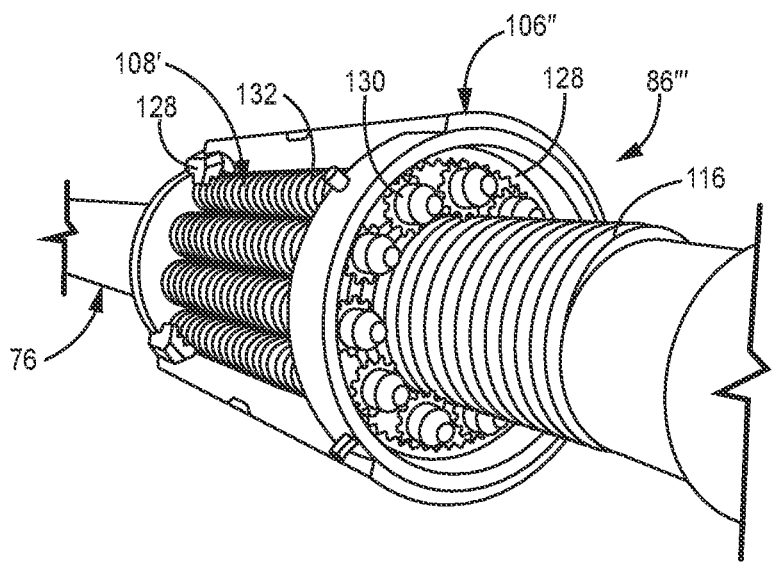
FIG. 7 is an isometric view showing of a drive mechanism.
Figure 8:
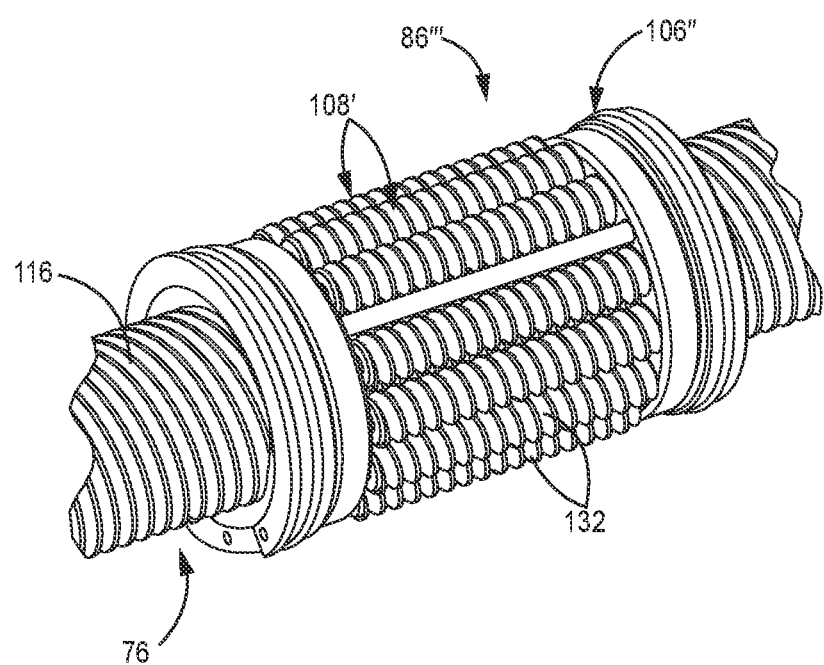
FIG. 8 is an isometric view showing of the drive mechanism shown in FIG. 7.

FIG. 7 is an isometric view of drive mechanism 86' with a portion of drive nut 106" removed. FIG. 8 is an isometric view of drive mechanism 86'" with the body of drive nut 106" removed to show rolling elements 108'. Drive mechanism 86' is substantially similar to drive mechanism 86" (FIG. 6) and drive mechanism 86 (best seen in FIG. 5). Drive mechanism 86'" includes screw 76, drive nut 106", and rolling elements 108'. Drive nut 106" includes drive rings 128 and support member 129. Rolling elements 108' include end rollers 130 and roller shafts 132.

Drive nut 106" surrounds a portion of screw 76 and rolling elements 108' are disposed between drive nut 106" and screw 76. In the example shown, rolling elements 108' are rollers including end rollers 130 and roller shafts 132. As such, drive mechanism 86'" can be considered to be a roller screw. Rolling elements 108' support drive nut 106" relative screw 76 such that drive nut 106" does not contact screw 76. Rolling elements 108' are disposed circumferentially and symmetrically about screw 76. Roller shafts 132 extend between and connect pairs of end rollers 130. As such, each rolling element 108' can include an end roller 130 at a first end of the roller shaft 132 and can further include an end roller 130 at a second end of the roller shaft 132. Each roller shaft 132 includes threading configured to mate with screw thread 116 to exert driving force on screw 76 by that threaded interface. Each end roller 130 includes teeth. End rollers 130 extend between and engage drive rings 128 at opposite ends of drive nut 106''. The teeth of end rollers 130 engage the teeth of drive ring 128. The teeth of end rollers 130 mesh with the teeth of drive rings 128. End rollers 130 can be considered to be planetary gears. End rollers 130 do not directly engage with screw 76. Instead, each roller shaft 132 includes threading configured to mate with the screw thread to exert driving force on screw 76 by that threaded interface. As drive nut 106'' rotates, engagement between end rollers 130 and drive rings 128 causes each rolling element 108' to rotate about its own axis and causes the array of rolling elements 108' to rotate about pump axis PA. Roller shafts 132 engage the screw thread and exert an axial driving force on the screw thread to linearly displace screw 76 along pump axis PA.

As drive nut 106'' rotates, engagement between end rollers 130 and drive rings 128 causes each rolling element 108' to rotate about its own axis and causes the array of rolling elements 108' to rotate about pump axis PA-PA. Roller shafts 132 engage and exert a driving force on screw thread 116 to linearly displace screw 76.

Figure 9A:
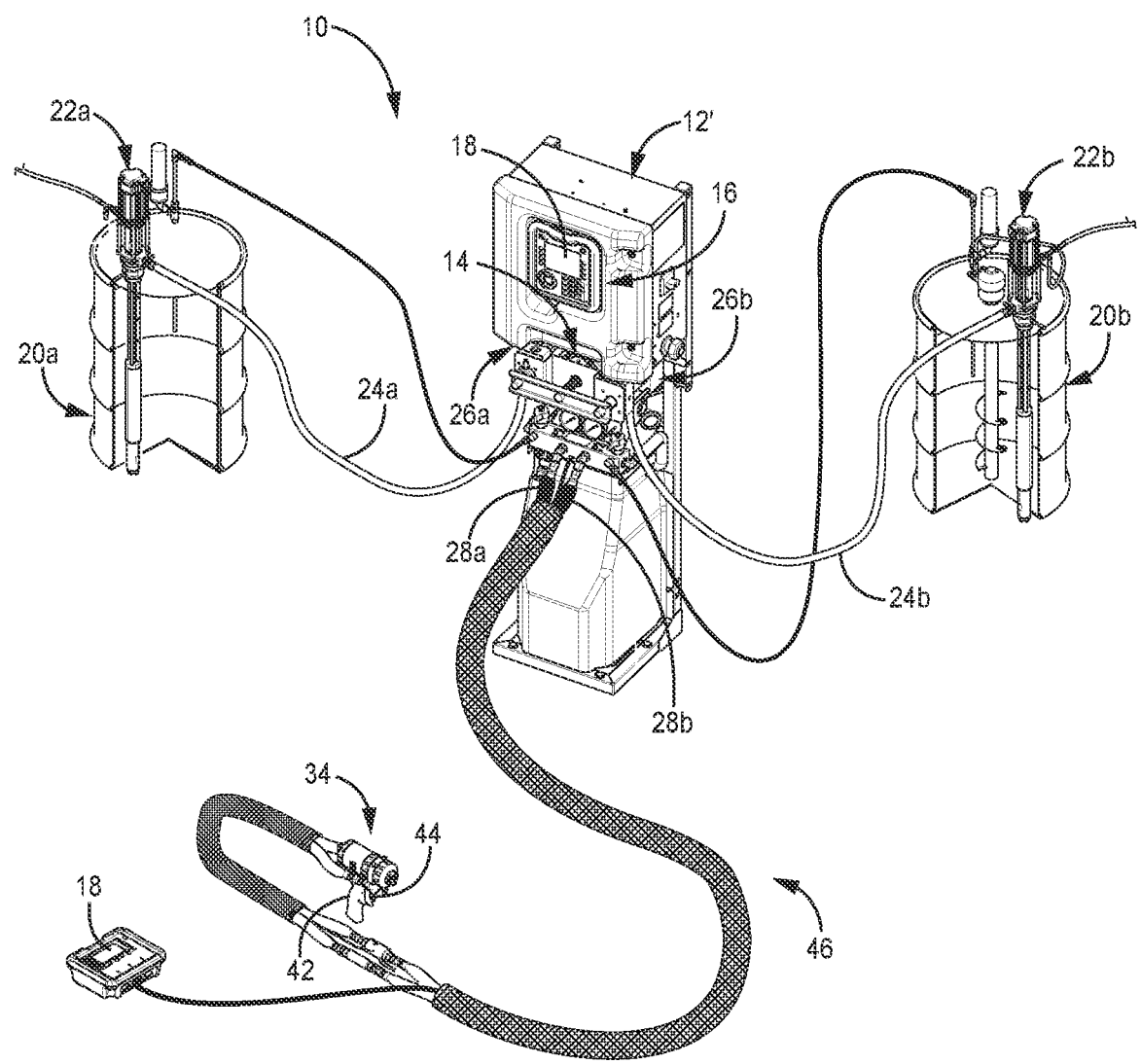
FIG. 9A is an isometric view of the plural component system of FIG. 1A.
Figure 9B:
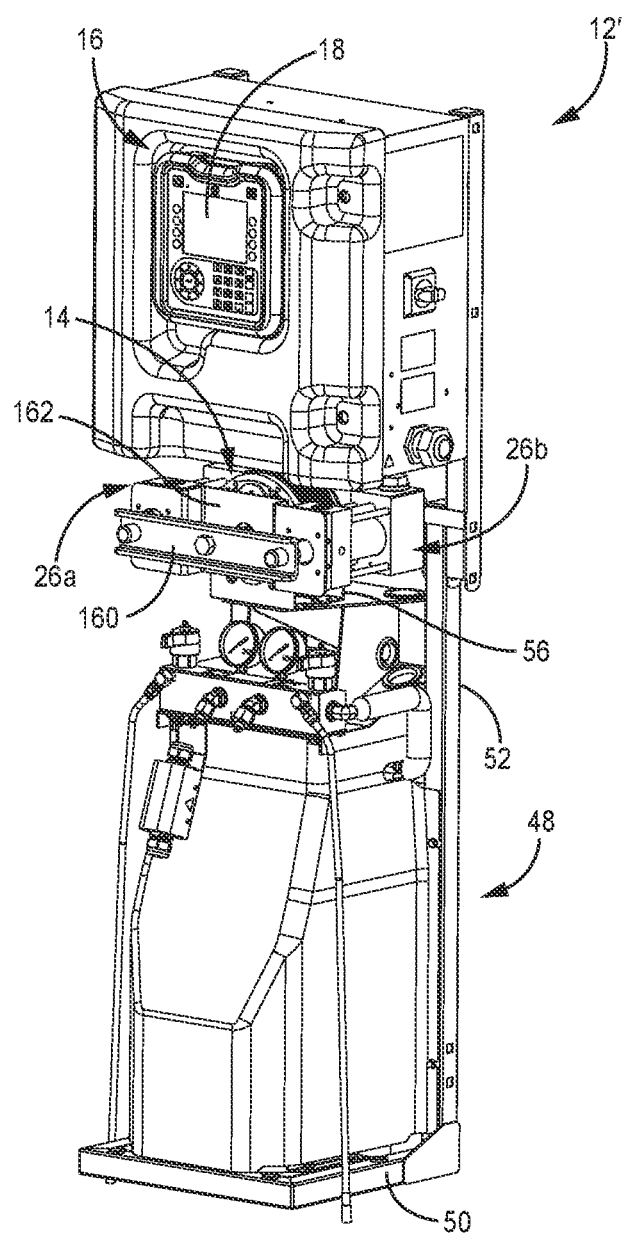
FIG. 9B is an isometric view of a proportioner for plural component system.
Figure 10:
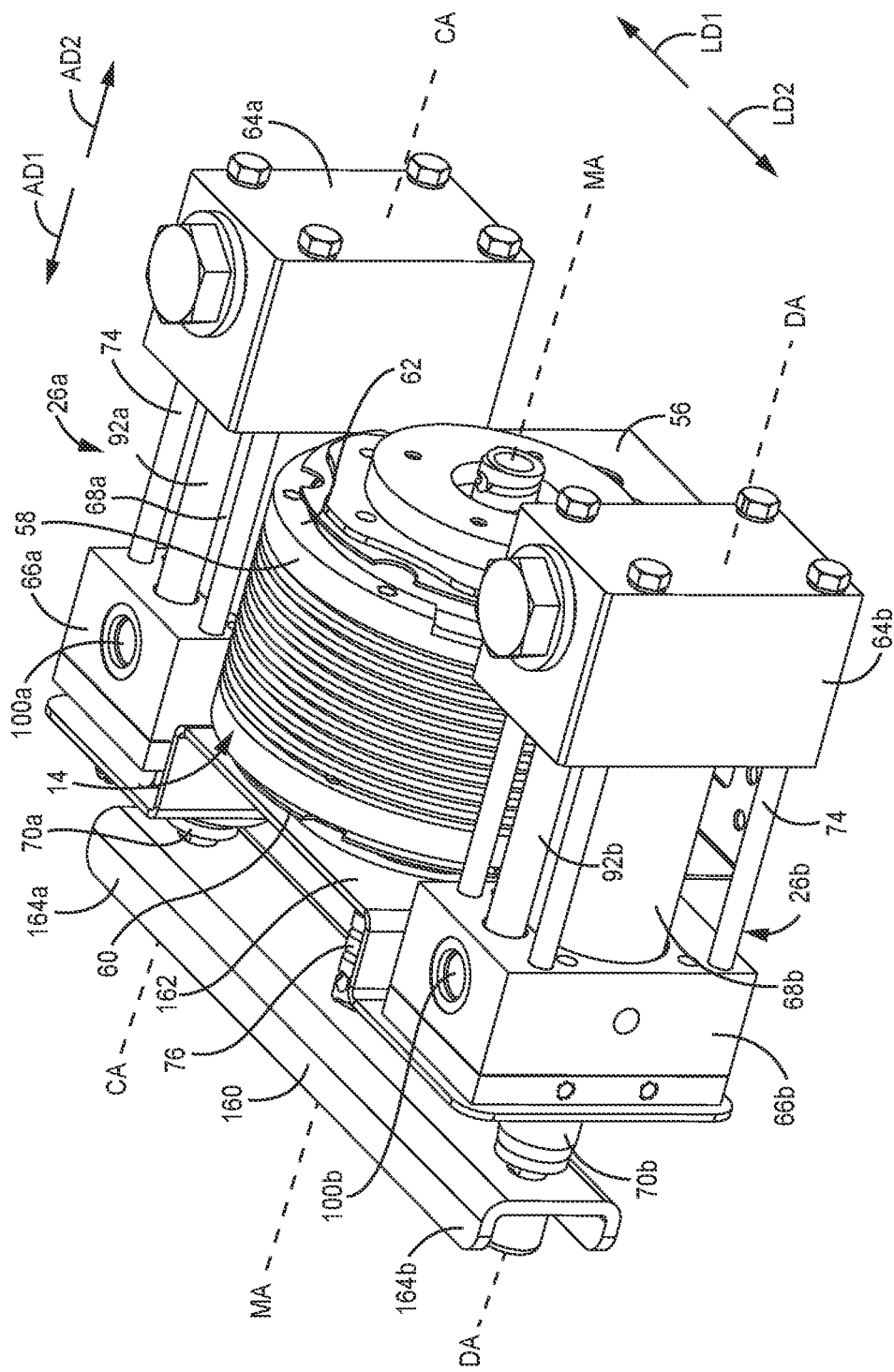
FIG. 10 is an isometric view of proportioner pumps and a motor of the proportioner of FIG. 9B.

FIG. 9A is an isometric view of system 10. FIG. 9B is an isometric view of proportioner 12'. FIG. 10 is an isometric view of proportioner pumps 26a, 26b and motor 14 of proportioner 12'. FIGS. 9A-10 will be discussed together. Proportioner 12'; motor 14; controller 16; user interface 18; fluid tanks 20a, 20b; feed pumps 22a, 22b; feed lines 24a, 24b; proportioner pumps 26a, 26b; supply lines 28a, 28b; and applicator 34 of system 10 are shown. Frame 48 supporting components of proportioner 12' includes base portion 50, vertical portion 52, and motor bracket 56. Housing 58, first axial end 60, and second axial end 62 of motor 14 are shown. Proportioner pumps 26a, 26b respectively include inlet housings 64a, 64b; outlet housings 66a, 66b; pump cylinders 68a, 68b; pistons 70a, 70b; rods 74; and transfer tubes 92a, 92b. Screw 76 is shown. Yoke 160 and support bracket 162 are shown.

System 10 can be utilized to generate and apply spray foam, among other options. Proportioner 12' supports control components of the system 10 and supports pumping components of the system 10. Proportioner 12' is substantially similar to proportioner 12 but with a different arrangement of motor 14 and proportioner pumps 26a, 26b.

Frame 48 supports various components of proportioner 12' and system 10. Base portion 50 supports other components of proportioner 12'. Base portion 50 rests on a support surface, such as the ground or the bed of a truck. Base portion 50 can be fixed or not fixed to the support surface. Proportioner 12' can be moved between job sites and to different locations within a single job site. Vertical portion 52 extends generally vertically from base portion 50.

Motor 14 is fixed to frame 48 such that motor 14 is fixed relative to motor axis MA-MA during operation. Motor bracket 56 is fixed to housing 58 and frame 48. Motor bracket 56 fixes motor 14 relative frame 48 and aligns motor 14 on motor axis MA-MA. Motor bracket 56 can be formed from one or more components supporting motor 14 relative to frame 48. For example, motor bracket 56 can include plates connected motor 14 and frame 48.

Proportioner pumps 26a, 26b are disposed on opposite lateral sides of motor 14. Proportioner pumps 26a, 26b are statically connected to motor 14 by support bracket 162. Proportioner pumps 26a, 26b are dynamically connected to motor 14 by yoke 160.

Proportioner pump 26a is disposed on a first lateral side of motor 14 and proportioner pump 26b is disposed on a second axial side of motor 14. Proportioner pump 26a is spaced in first lateral direction LD1 from motor 14. Proportioner pump 26b is spaced in second lateral direction LD2 from motor 14. As such, motor 14 is disposed laterally between and bracketed by proportioner pumps 26a, 26b. In the example shown, motor 14 axially overlaps with at least a portion of each of inlet housings 64a, 64b, outlet housings 66a, 66b, and pump cylinders 68a, 68b.

Proportioner pumps 26a, 26b extend along axes parallel to motor axis MA-MA. Piston 70a is configured to reciprocate on axis CA-CA and piston 70b is configured to reciprocate on axis DA-DA. Proportioner pumps 26a, 26b can each be spaced the same lateral distance from motor 14 or different lateral distances from motor 14. As such, first lateral distance LD1 can be the same as or different from second lateral distance LD2. For example, where proportioner pumps 26a, 26b have different displacements, the lateral spacing between each proportioner pump 26a, 26b and motor 14 can vary to change the moment generated between each proportioner pumps 26a, 26b and motor 14 and balance the pump reaction forces generated by each proportioner pump 26a, 26b across yoke 160. In the example shown, proportioner pumps 26a, 26b project from a front of proportioner 12'.

Proportioner pumps 26a, 26b are supported by frame 48 and motor 14. Proportioner pumps 26a, 26b are connected to support bracket 162. In some examples, each of proportioner pumps 26a, 26b and motor 14 are connected to support bracket 162. Outlet housings 66a, 66b are connected to support bracket 162. Pump cylinders 68a, 68b extend axially between outlet housings 66a, 66b and inlet housings 64a, 64b, respectively. Rods 74 extend between outlet housings 66a, 66b and inlet housings 64a, 64b and are disposed around pump cylinders 68a, 68b. Proportioner pumps 26a, 26b can be cantilevered.

Screw 76 is disposed coaxially with motor 14 on motor axis MA-MA. In some examples, screw 76 extends through motor 14. Screw 76 interfaces with yoke 160 to drive yoke 160 axially along motor axis MA-MA. Screw 76 can be connected to yoke 160 in any desired manner, such as by press-fitting, adhesive, or fasteners, among other options. In the example shown, screw 76 is driven linearly along motor axis MA-MA by rotation of the rotor, as discussed in more detail above. For example, screw 76 can interface with yoke 160 and drive yoke 160 axially by the axial displacement of screw 76. It is understood that, in some examples, screw 76 is rotatably driven on motor axis MA-MA by rotation of the rotor, as discussed in more detail above. For example, yoke 160 can include a nut, similar to driven nuts 138a, 138b (FIGS. 4A-4C), mounted to screw 76 such that rotation of screw 76 causes the nut, and thus yoke 160, to displace axially along motor axis MA-MA.

Piston 70a of proportioner pump 26a is connected to first lateral end 164a of yoke 160 and piston 70b of proportioner pump 26b is connected to second lateral end 164b of yoke 160. Pistons 70a, 70b can extend through support bracket 162. Pistons 70a, 70b can be connected to yoke 160 in any desired manner, such as by press-fitting, interfaced threading, adhesive, or fasteners, among other options. Reciprocation of yoke 160 drives pistons 70a, 70b through respective pump cycles to cause pumping of the component materials.

Screw 76 connects with yoke 160 at a location laterally between the locations where pistons 70a, 70b connect to yoke 160. In examples where screw 74 translates linearly, pistons 70a, 70b and screw 74 are rigidly connected to yoke. Pistons 70a, 70b being connected to yoke 160 prevents yoke 160 from rotating on motor axis MA-MA. Proportioner pumps 26a, 26b and yoke 160 thereby form a clocking mechanism to prevent rotation of screw 74 about motor axis MA-MA. Screw 76 can extend through support bracket 162. Each of screw 76 and pistons 70a, 70b extend in first axial direction AD1 to connect to yoke 160. As such each of screw 76 and pistons 70a, 70b can extend into the same axial side of yoke 160.

Support bracket 162 is disposed axially between motor 14 and yoke 160. Support bracket 162 is disposed axially between the static components of proportioner pumps 26a, 26b and yoke 160. In the example shown, screw 76 extends through a portion central portion of support bracket 162 that connects to motor 14. The central portion can be recessed relative to the lateral flanges of support bracket 162 that connect to proportioner pumps 26a, 26b. As such, the lateral flanges can be spaced in first axial direction AD1 relative to motor 14.

During operation, motor 14 drives pistons 70a, 70b of each proportioner pump 26a, 26b through respective pump cycles to pump first and second component materials. The first and second component materials can be different materials configured to combine to form a plural component spray material having desired material properties, such as a spray foam. The pistons 70a, 70b are connected to motor 14 by screw 76 and yoke 160 and driven axially by motor 14. Pistons 70a, 70b of proportioner pumps 26a, 26b simultaneously translate in the first axial direction AD1 and in the second axial direction AD2. In the example shown, each proportioner pump 26a, 26b simultaneously proceeds through a fill stroke. As such, proportioner pumps 26a, 26b are in-phase, with both proportioner pumps 26a, 26b proceeding through the same stroke of the pump cycle simultaneously. In the example shown, yoke 160 moves axially away from motor 14 during the fill stroke of each proportioner pump 26a, 26b.

Yoke 160 connecting proportioner pumps 26a, 26b to motor 14 facilitates a compact arrangement providing a reduced profile for proportioner 12'. Proportioner pumps 26a, 26b axially overlapping with motor 14 also facilitates a compact profile. Proportioner pumps 26a, 26b simultaneously proceeding through respective fill strokes provides further advantages. If feed lines 24a, 24b are over-pressurized, such as due to thermal expansion, controller 16 can cause motor 14 to cause each proportioner pump 26a, 26b to proceed through part or all of the fill strokes to reduce pressure in feed lines 24a, 24b, which reduces the pressure on the inlet checks of proportioner pumps 26a, 26b. In addition, controller 16 can be configured to cause motor 14 to displace each piston 70a, 70b in second axial direction AD2 and further into cylinders 68a, 68b based on operation being paused or system 10 being put into a park mode, such as at the end of a job. For example, user interface 18 can include a button associated with the park mode. Driving pistons 70a, 70b in second axial direction AD2 ensures that any wet portions of pistons 70a, 70b are submerged, preventing undesired curing of the component material on those portions of pistons 70a, 70b that are disposed outside of the static portions of proportioner pump 26a, 26b and that can occur due to the component materials being sensitive to air. Proportioner pumps 26a, 26b being in-phase facilitates simultaneous parking of pistons 70a, 70b.

Figure 11A:
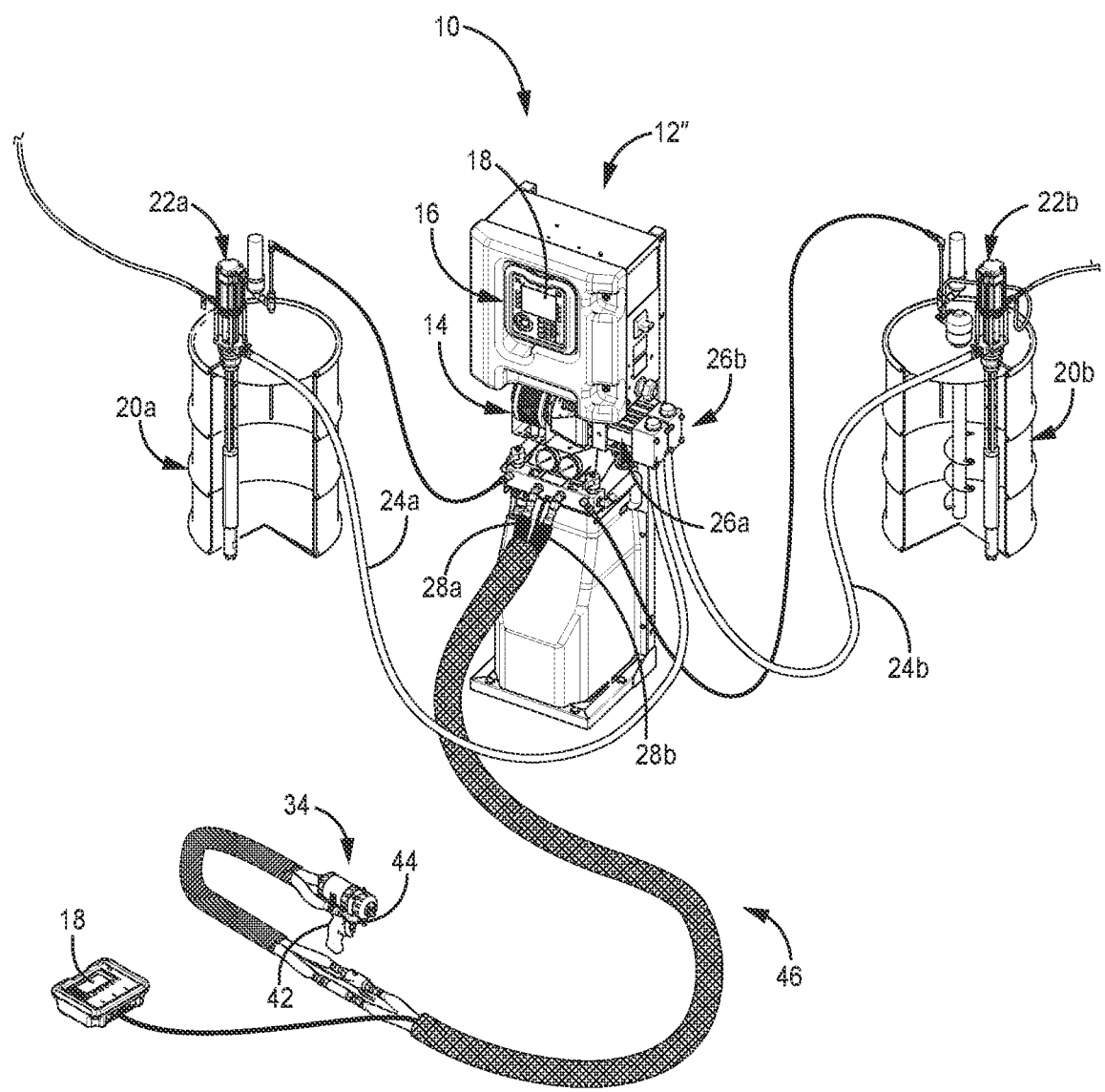
FIG. 11A an isometric view of the plural component system of FIG. 1A.
Figure 11B:
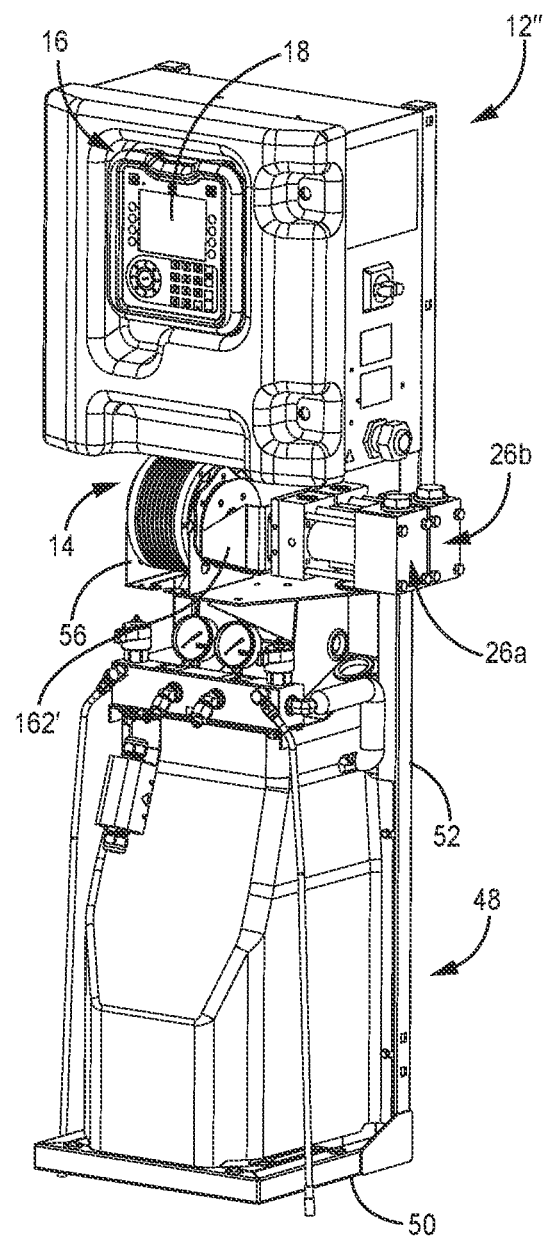
FIG. 11B is an isometric view of a proportioner for plural component system.
Figure 12A:
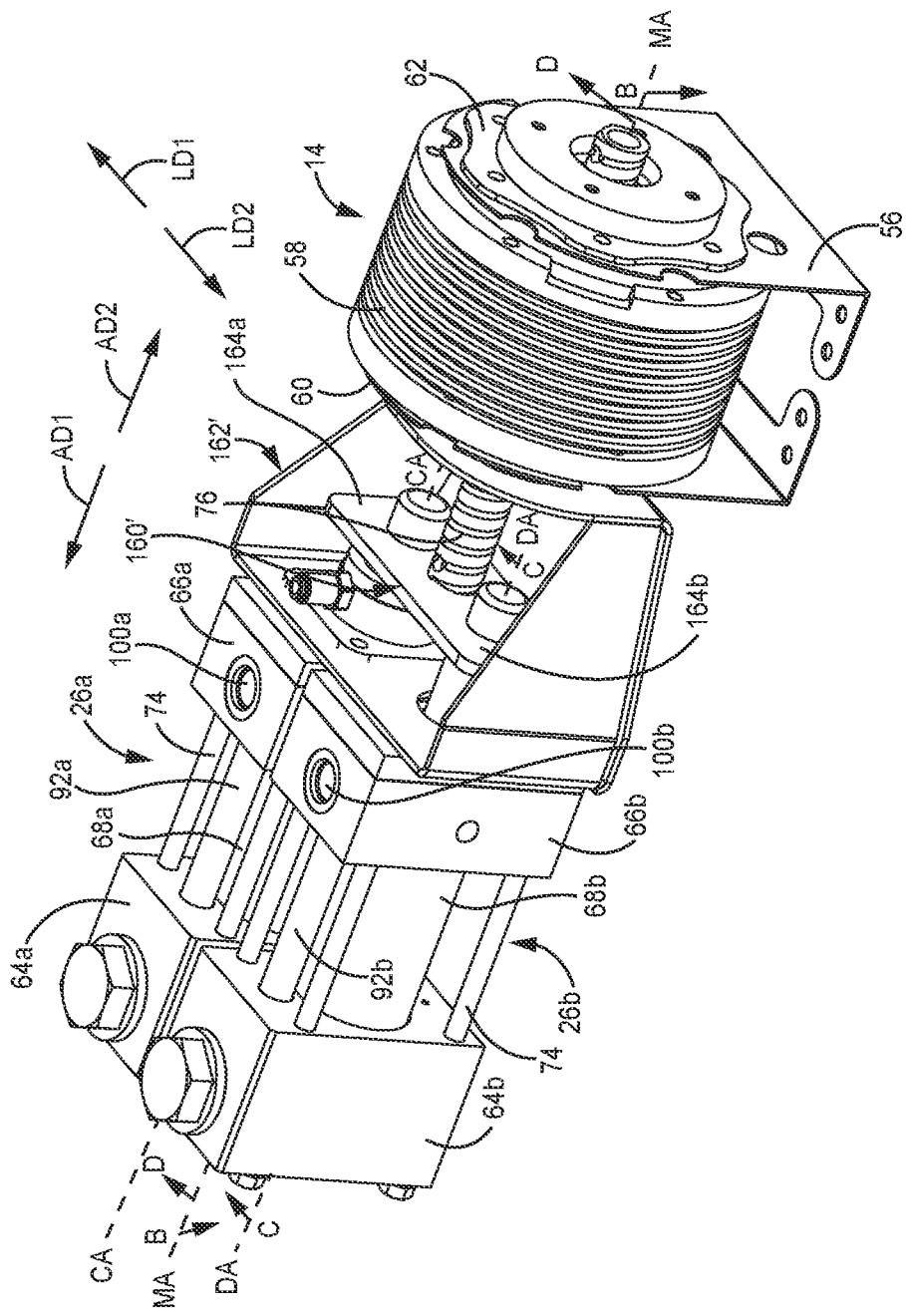
FIG. 12A is an isometric view of proportioner pumps and a motor of the proportioner of FIG. 11B.
Figure 12B:
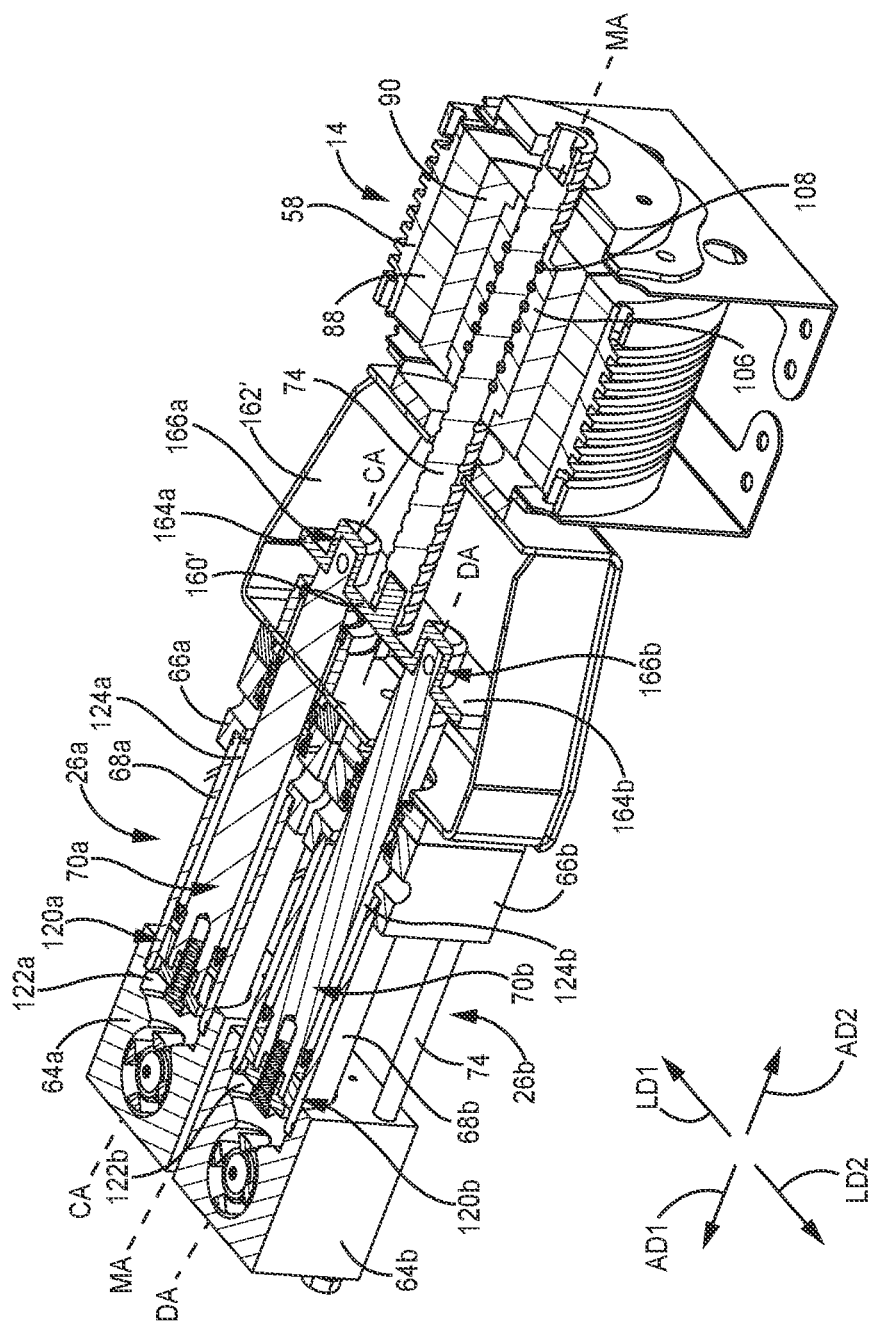
FIG. 12B is a cross-sectional view taken along line B-B in FIG. 12A.
Figure 12C:
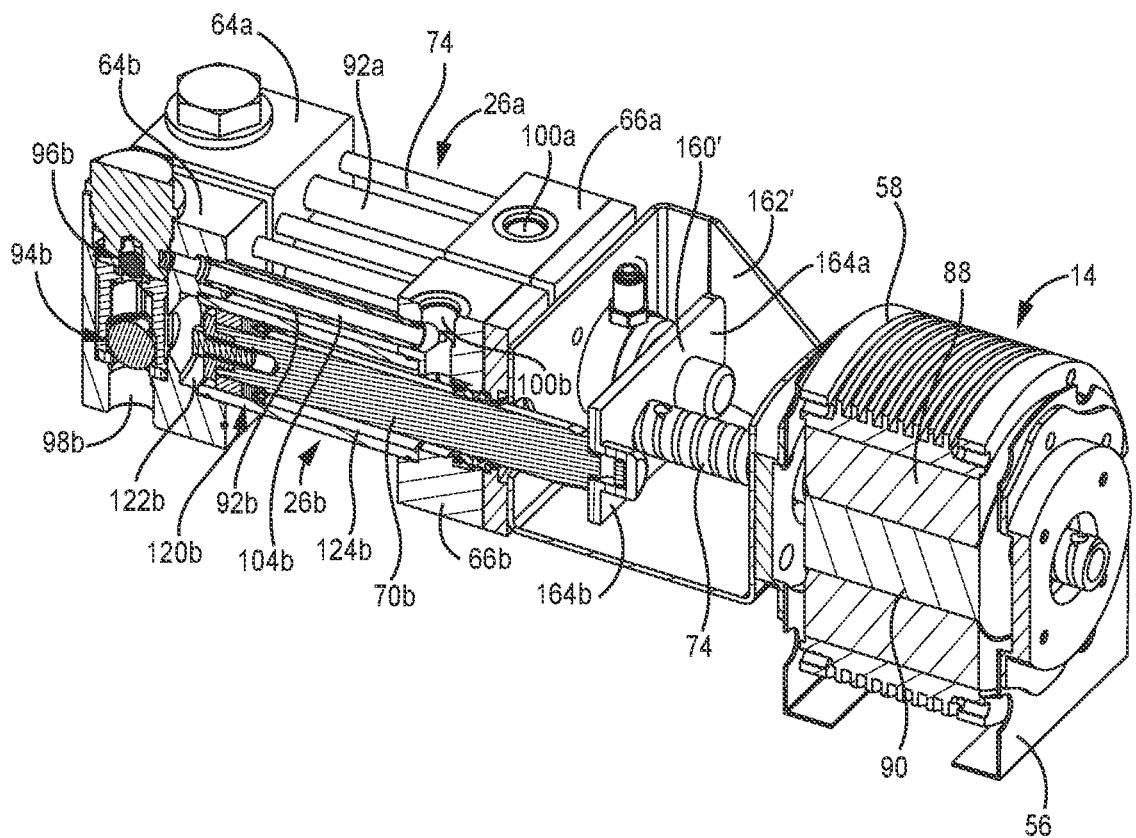
FIG. 12C is a cross-sectional view taken along line C-C in FIG. 12A.
Figure 12D:
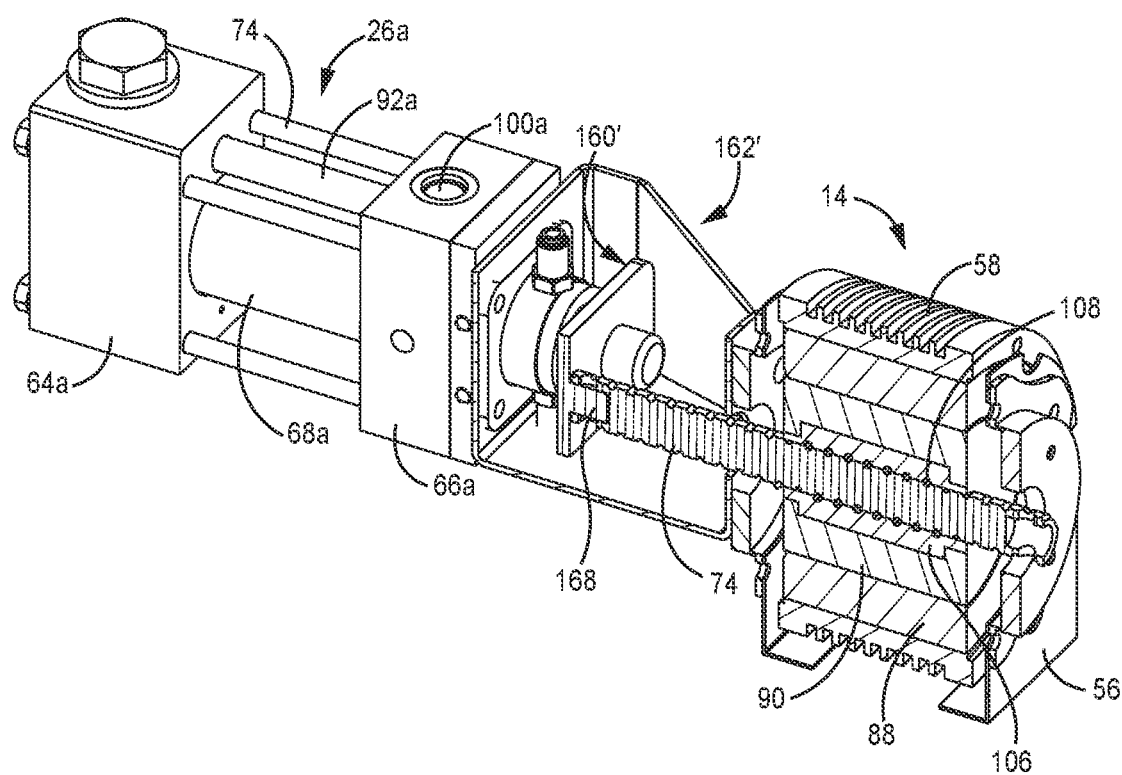
FIG. 12D is a cross-sectional view taken along line D-D in FIG. 12A.

FIG. 11A an isometric view of system 10. FIG. 11B is an isometric view of a proportioner 12". FIG. 12A is an isometric view of proportioner pumps 26a, 26b and motor 14 of proportioner 12". FIG. 12B is a cross-sectional view taken along line B-B in FIG. 12A. FIG. 12C is a cross-sectional view taken along line C-C in FIG. 12A. FIG. 12D is a cross-sectional view taken along line D-D in FIG. 12A. FIGS. 11A-12D will be discussed together. Proportioner 12"; motor 14; controller 16; user interface 18; fluid tanks 20a, 20b; feed pumps 22a, 22b; feed lines 24a, 24b; proportioner pumps 26a, 26b; supply lines 28a, 28b; and applicator 34 of system 10 are shown. Frame 48 supports components of proportioner 12" and includes base portion 50, vertical portion 52, pump supports 54, and motor bracket 56. Housing 58, first axial end 60, second axial end 62, stator 88, and rotor 90 of motor 14 are shown. Proportioner pumps 26a, 26b respectively include inlet housings 64a, 64b; outlet housings 66a, 66b; pump cylinders 68a, 68b; pistons 70a, 70b; rods 74; and transfer tubes 92a, 92b. Drive mechanism 86 includes screw 76, drive nut 106, and rolling elements 108. Yoke 160' and support bracket 162' are shown.

System 10 can be utilized to generate and apply spray foam, among other options. Proportioner 12" supports control components of the system 10 and supports pumping components of the system 10. Proportioner 12" is substantially similar to proportioner 12 and proportioner 12' but with a different arrangement of motor 14 and proportioner pumps 26a, 26b.

Frame 48 supports various components of proportioner 12" and system 10. Base portion 50 supports other components of proportioner 12". Base portion 50 rests on a support surface, such as the ground or the bed of a truck. Base portion 50 can be fixed or not fixed to the support surface. Proportioner 12" can be moved between job sites and to different locations within a single job site. Vertical portion 52 extends generally vertically from base portion 50.

Motor 14 is fixed to frame 48 such that motor 14 is fixed relative to motor axis MA-MA during operation. Rotor 90 is configured to rotate about motor axis MA-MA in response to power through stator 88. Drive nut 106 is disposed within and connected to rotor 90 to rotate with rotor 90 about motor axis MA-MA. Rolling elements 108 are disposed between rotor 90 and screw 76. More specifically, rolling elements 108 are disposed between drive nut 106 and screw 76. Rolling elements 108 can be of any configuration suitable for causing linear displacement of screw 76 based on rotation of drive nut 106. For example, rolling elements 108 can be formed by balls or elongate rollers, among other options.

Motor bracket 56 is fixed to housing 58 and frame 48. Motor bracket 56 fixes motor 14 relative frame 48 and aligns motor 14 on motor axis MA-MA. Motor bracket 56 can be formed from one or more components supporting motor 14 relative to frame 48. For example, motor bracket 56 can include plates connected motor 14 and frame 48.

Proportioner pumps 26a, 26b are disposed on the same axial side of motor 14. Each of proportioner pumps 26a, 26b is spaced from motor 14 in first axial direction AD1. In the example shown, proportioner pumps 26a, 26b are disposed on opposite lateral sides of motor axis MA-MA. Proportioner pumps 26a, 26b are disposed adjacent one another. Proportioner pumps 26a, 26b extend along axes parallel to motor axis MA-MA. Piston 70a is configured to reciprocate on axis CA-CA and piston 70b is configured to reciprocate on axis DA-DA. Proportioner pumps 26a, 26b are statically connected to motor 14 by support bracket 162'. Proportioner pumps 26a, 26b are dynamically connected to motor 14 by yoke 160'.

Proportioner pumps 26a, 26b can each be spaced the same lateral distance from motor 14 or different lateral distances from motor 14. As such, first lateral distance LD1 can be the same as or different from second lateral distance LD2. For example, where proportioner pumps 26*a*, 26*b* have different displacements, the lateral spacing between each proportioner pump 26*a*, 26*b* and motor 14 can vary to change the moment generated between each proportioner pumps 26*a*, 26*b* and motor 14 and balance the pump reaction forces generated by each proportioner pump 26*a*, 26*b* across yoke 160'. In the example shown, proportioner pumps 26*a*, 26*b* project from a front of proportioner 12".

Proportioner pumps 26*a*, 26*b* are supported by frame 48 and motor 14. Proportioner pumps 26*a*, 26*b* are connected to support bracket 162'. Support bracket 162' extends between and connects proportioner pumps 26*a*, 26*b* and motor 14. In the example shown, support bracket 162' laterally surrounds yoke 160'. Outlet housings 66*a*, 66*b* are connected to support bracket 162'. Pump cylinders 68*a*, 68*b* extend axially between outlet housings 66*a*, 66*b* and inlet housings 64*a*, 64*b*, respectively. Rods 74 extend between outlet housings 66*a*, 66*b* and inlet housings 64*a*, 64*b* and are disposed around pump cylinders 68*a*, 68*b*. Proportioner pumps 26*a*, 26*b* can be cantilevered with inlet housings 64*a*, 64*b* forming the free ends of cantilevered proportioner pumps 26*a*, 26*b*.

Screw 76 is disposed coaxially with motor 14 on motor axis MA-MA. In some examples, screw 76 extends through motor 14. Screw 76 interfaces with yoke 160' to drive yoke 160' axially along motor axis MA-MA. Screw 76 can be connected to yoke 160' in any desired manner, such as by press-fitting, adhesive, or fasteners, among other options. Yoke 160' can include a chamber for receiving an end of screw 76. In the example shown, screw 76 is driven linearly along motor axis MA-MA by rotation of the rotor 90, as discussed in more detail above. For example, screw 76 can interface with yoke 160' and drive yoke 160' axially by the axial displacement of screw 76. It is understood that, in some examples, screw 76 is rotatably driven on motor axis MA-MA by rotation of the rotor 90, as discussed in more detail above. For example, yoke 160' can include a nut, similar to driven nuts 138*a*, 138*b* (FIGS. 4A-4C), mounted to screw 76 such that rotation of screw 76 causes the nut, and thus yoke 160', to displace axially along motor axis MA-MA.

Piston 70*a* of proportioner pump 26*a* is connected to first lateral end 164*a* of yoke 160' and piston 70*b* of proportioner pump 26*b* is connected to second lateral end 164*b* of yoke 160'. Pistons 70*a*, 70*b* can extend through support bracket 162'. Pistons 70*a*, 70*b* can be connected to yoke 160' in any desired manner, such as by press-fitting, interfaced threading, adhesive, or fasteners, among other options. Yoke 160' can include chambers 166*a*, 166*b* for receiving the ends of each piston 70*a*, 70*b*. Reciprocation of yoke 160' drives pistons 70*a*, 70*b* through respective pump cycles to cause pumping of the component materials.

Screw 76 connects with yoke 160' at a location laterally between the locations where pistons 70*a*, 70*b* connect to yoke 160'. In the example shown, screw 76 includes a chamber receiving projection 168 extending axially from yoke 160'. In examples where screw 74 translates linearly, pistons 70*a*, 70*b* and screw 74 are rigidly connected to yoke. Pistons 70*a*, 70*b* being connected to yoke 160' prevents yoke 160' from rotating on motor axis MA-MA. Proportioner pumps 26*a*, 26*b* and yoke 160' thereby form a clocking mechanism to prevent rotation of screw 74 about motor axis MA-MA. Screw 76 extends in first axial direction AD1 to connect to yoke 160' and pistons 70*a*, 70*b* extend in second axial direction AD2 to connect to yoke 160'. As such, screw 76 can extend into a first axial side of yoke 160' and pistons 70*a*, 70*b* can extend into a second axial side of yoke 160' opposite the first axial side of yoke 160'.

Support bracket 162' is disposed axially between motor 14 and the static components of proportioner pumps 26*a*, 26*b*. Support bracket 162' is disposed axially between motor 14 and yoke 160'. Support bracket 162' is disposed axially between yoke 160' and the static components of proportioner pumps 26*a*, 26*b*. Screw 76 extends through an opposite end of support bracket 162' from pistons 70*a*, 70*b*.

During operation, motor 14 drives pistons 70*a*, 70*b* of each proportioner pump 26*a*, 26*b* through respective pump cycles to pump first and second component materials. The first and second component materials can be different materials configured to combine to form a plural component spray material having desired material properties, such as a spray foam. The pistons 70*a*, 70*b* are connected to motor 14 by screw 76 and yoke 160' and driven axially by motor 14. Pistons 70*a*, 70*b* of proportioner pumps 26*a*, 26*b* simultaneously translate in the first axial direction AD1 and in the second axial direction AD2. In the example shown, each proportioner pump 26*a*, 26*b* simultaneously proceeds through a fill stroke. As such, proportioner pumps 26*a*, 26*b* are in-phase, with both proportioner pumps 26*a*, 26*b* proceeding through the same stroke of the pump cycle simultaneously.

Yoke 160' connecting proportioner pumps 26*a*, 26*b* to motor 14 facilitates a compact arrangement providing a reduced profile for proportioner 12". Proportioner pumps 26*a*, 26*b* simultaneously proceeding through respective fill strokes provides further advantages. If feed lines 24*a*, 24*b* are over-pressurized, such as due to thermal expansion, controller 16 can cause motor 14 to cause each proportioner pump 26*a*, 26*b* to proceed through part or all of the fill strokes to reduce pressure in feed lines 24*a*, 24*b*, which reduces the pressure on the inlet checks of proportioner pumps 26*a*, 26*b*. In addition, controller 16 can be configured to cause motor 14 to displace each piston 70*a*, 70*b* in first axial direction AD1 and further into cylinders 68*a*, 68*b* based on operation being paused or system 10 being put into a park mode, such as at the end of a job. For example, user interface 18 can include a button associated with the park mode. Driving pistons 70*a*, 70*b* in first axial direction AD1 ensures that any wet portions of pistons 70*a*, 70*b* are submerged, preventing undesired curing of the component material on those portions of pistons 70*a*, 70*b* that are disposed outside of the static portions of proportioner pump 26*a*, 26*b* and that can occur due to the component materials being sensitive to air. Proportioner pumps 26*a*, 26*b* being in-phase facilitates simultaneous parking of pistons 70*a*, 70*b*.

In any of the examples discussed above in FIGS. 1-12D, rotor 90 and drive mechanisms 86, 86', 86", 86''' can be sized to provide a desired revolution to stoke ratio. In some examples, rotor 90 and drive mechanisms 86, 86', 86", 86''' are sized such that one revolution of rotor 90 results in a full stroke of pistons 70*a*, 70*b* in one of first axial direction AD1 and second axial direction AD2. A full revolution in an opposite rotational direction results in a full stroke of pistons 70*a*, 70*b* in the opposite axial direction. As such, two revolutions in opposite directions can provide a full pump cycle of pistons 70*a*, 70*b*. Proportioner pumps 26*a*, 26*b* and motor 14 can thereby provide a 1:1 ratio between revolutions of rotor 90 and pumping strokes.

It is understood, however, that rotor 90 and drive mechanisms 86, 86', 86", 86''' can be sized to provide any desired revolution to stroke ratio. It is further understood that controller 16 can control operation of motor 14 such that the actual stroke length is dynamic and varies can during operation. Controller 16 can cause the stroke length to vary between the downstroke and the upstroke. In some examples, controller 16 is configured to control operation between a maximum revolution to stroke ratio and a minimum revolution to stroke ratio. Proportioner pumps 26a, 26b and motor 14 can be configured to provide any desired revolution to stroke ratio. In some examples, proportioner pumps 26a, 26b and motor 14 provides a revolution to stroke ratio of up to about 4:1. It is understood that other maximum revolution to stroke ratios are possible, such as about 1:1, 2:1, 3:1, or 5:1, among other options. In some examples, proportioner pumps 26a, 26b and motor 14 can provide a revolution to stroke ratio between about 0.25:1-7:1. It is understood that any of the ranges discussed can be an inclusive range such that the boundary values are included within the range. It is further understood that each of the ranges discussed can vary from the specified range while still falling within the scope of this disclosure.

Motor 14 and drive mechanism 86, 86', 86", 86''' can be configured to displace pistons 70a, 70b at least about 6.35 mm (about 0.25 in.) per rotor revolution. In some examples, motor 14 and drive mechanism 86 are configured to displace pistons 70a, 70b between about 8.9-30.5 mm (about 0.35-1.2 in.) per rotor revolution. In some examples, motor 14 and drive mechanism 86 are configured to displace pistons 70a, 70b between about 8.9-11.4 mm (about 0.35-0.45 in.). In some examples, motor 14 and drive mechanism 86 are configured to displace pistons 70a, 70b between about 19-21.6 mm (about 0.75-0.85 in.). In some examples, motor 14 and drive mechanism 86 are configured to displace pistons 70a, 70b between about 24.1-26.7 mm (about 0.95-1.05 in.). The axial displacement per rotor revolution provided by proportioner pumps 26a, 26b and motor 14 facilitates precise control and quick responsiveness during pumping. The axial displacement per rotor revolution facilitates quick changeover and provides more efficient pumping while reducing wear on components of proportioner pumps 26a, 26b and motor 14.

Proportioner pumps 26a, 26b and motor 14 is configured to pump according to a revolution to displacement ratio. More specifically, motor 14 and drive mechanism 86, 86', 86", 86''' are configured to provide a desired revolution to displacement ratio between revolutions of rotor 90 and the linear travel distance of pistons 70a, 70b, as measured in inches, for each revolution of rotor 90. In some examples, the revolution to displacement ratio (rev/in.) is less than about 4:1. In some examples, the revolution to displacement ratio is between about 0.85:1 and 3.25:1. In some examples, the revolution to displacement ratio is between about 1:1-3:1. In some examples, the revolution to displacement ratio is between about 1:1-2.75:1. In some examples, the revolution to displacement ratio between is about 1:1-2.55:1. In some examples, the revolution to displacement ratio is between about 1:1-1.3:1. In some examples, the revolution to displacement ratio is between about 0.9:1-1.1:1. In some examples, the revolution to displacement ratio is between about 2.4:1-2.6:1. The low revolution to displacement ratio provided by proportioner pumps 26a, 26b and motor 14 relative to other electrically-powered pumps, such as crank-powered pumps that require reduction gearing to generate sufficient pumping torque and typically have revolution to displacement ratios of about 8:1 or higher, facilitates more efficient pumping, generates less wear, and provides quick responsiveness for changing stroke direction. Rotor 90 can be driven at a lower rotational speed to generate the same linear speed, thereby generating less heat during operation.

Figure 13:
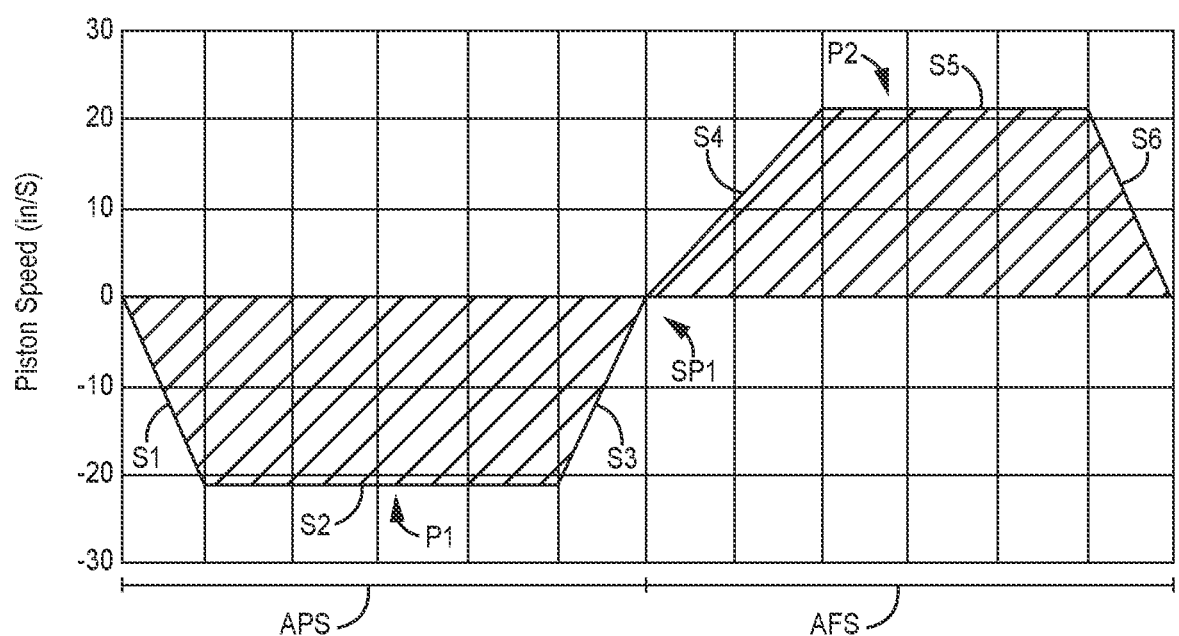
FIG. 13 is a graph illustrating a piston speed profile for in-phase proportioner pumps.

FIG. 13 is a graph illustrating a piston speed profile SP1 for proportioner pumps 26a, 26b. Piston speed is shown on the vertical axis and areas associated with a pressure stroke APS and fill stroke AFS are shown along the horizontal axis. Stroke profile P1 is associated with a pressure stroke of pistons 70a, 70b and stroke profile P2 is associated with a fill stroke of pistons 70a, 70b. It is understood that piston speed profile SP1 applies to examples where proportioner pumps 26a, 26b are disposed in-phase, such that each proportioner pump 26a, 26b simultaneously proceeds through the pressure and fill strokes, such as in the examples shown in FIGS. 9A-12D. As discussed above, proportioner pumps 26a, 26b displace fluid already within cylinders 68a, 68b during the pressure stroke and both displaces fluid from cylinders 68a, 68b and intakes additional fluid into cylinders 68a, 68b during the fill stroke, which fill stroke can also be referred to as a suction stroke.

Controller 16 is configured to control operation of motor 14 to control the speeds of pistons 70a, 70b through each of the pressure and fill strokes. Controller 16 can control the rotational speed and acceleration of rotor 90 such that rotor 90 accelerates slower on the fill stroke than on the pressure stroke. The slower acceleration on the fill stroke prevents formation of a vacuum within proportioner pumps 26a, 26b, thereby preventing undesired cavitation during the fill stroke. Controller 16 can further control rotation of rotor 90 such that the steady state speed on the fill stroke is less than the steady state speed on the pressure stroke, further preventing cavitation. Piston speed profile SP1 can thereby be asymmetric, with different profiles for the fill stroke and pressure stroke. It is understood that controller 16 can adjust the slope and plateau values for each of the pressure stroke and the fill stroke based on feedback from any one or more sensors and/or from motor 14. It is further understood that the slopes and plateau values shown for piston speed profile SP1 can vary from those shown.

Stroke profile P1 includes acceleration segment S1, steady speed segment S2, and deceleration segment S3. The stroke profile P2 includes acceleration segment S4, steady speed segment S5, and deceleration segment S6. Controller 16 is capable of controlling the speed of rotation of rotor 90 and thus the speed of reciprocation of pistons 70a, 70b to provide any desired piston speed profile SP1. Piston speed profile SP1 reduces pressure drop at changeovers, reduces the chance of cavitation, and cause proportioner pumps 26a, 26b to output fluid at consistent pressure and/or flow rate. Controller 16 can control reciprocation of pistons 70a, 70b, by controlling rotation of rotor 90, such that motor 14 and proportioner pumps 26a, 26b provide an output similar to that of a hydraulically powered proportioner pumps.

During acceleration segment S1, pistons 70a, 70b are moving through the pressure and accelerating. Inlet valves 94a, 94b close and outlet valves 96a, 96b open during the pressure stroke. After accelerating, pistons 70a, 70b move at a set, steady speed. In steady speed segment S2, pistons 70a, 70b continue to displace through the pressure stroke and move at the steady speed. The constant speed of pistons 70a, 70b results in stable pressure that maintains a consistent pressure and/or flowrate output from proportioner pumps 26a, 26b and generates an even spray at applicator 34. In deceleration segment S3, pistons 70a, 70b decelerate as pistons 70a, 70b approach the end of the pressure stroke. Pistons 70a, 70b change over from the pressure stroke and begin moving through the fill stroke at the intersection between deceleration segment S3 and acceleration segment S4, where the speed of pistons 70a, 70b is zero.

After completing the pressure stroke, pistons 70a, 70b are driven through respective fill strokes. During acceleration segment S4, pistons 70a, 70b are moving through the fill stroke and accelerating. Inlet valves 94a, 94b open and outlet valves 96a, 96b close during the fill stroke. It is desirable to have outlet valves 96a, 96b close in the shortest time period possible to minimize any flow below inlet valves 94a, 94b and to keep any pressure drop or flow rate change to a minimum during the changeover. Acceleration segment S4 has a more gradual slope than acceleration profile S1, such that pistons 70a, 70b can take a longer portion of the fill stroke to accelerate to the steady speed than pistons 70a, 70b take to accelerate to the steady speed during the pressure stroke. Acceleration segment S4 has a more gradual slope than acceleration profile S1 to ensure that the fluid flows into proportioner pumps 70a, 70b without generating a vacuum that could cause the fluid to cavitate and cause the outputs from proportioner pumps 70a, 70b to be off ratio. The gentler acceleration profile S4 relative to acceleration profile S1 avoids such cavitation and assists in maintaining the fluid ratio. Cavitation is not an issue during the pressure stroke as additional fluid is not being drawn into proportioner pumps 26a, 26b.

After accelerating, pistons 70a, 70b move at a set, steady speed. In steady speed segment S5, pistons 70a, 70b continue to displace through the fill stroke and move at the steady speed. In some examples, the speed of steady speed segment S5 is less than the speed of steady speed segment S2, to further avoid cavitation and maintain on-ratio pumping. The slower acceleration of acceleration profile S1 and the lower speed of steady speed segment S5 provides additional time for fluids to move into the proportioner pumps 26a, 26b, reducing vacuum pressure, avoiding cavitation, and maintaining the fluid ratio. The constant speed of pistons 70a, 70b during steady speed segment S5 also results in stable pressure and/or flow rate that maintains the ratio at proportioner pumps 26a, 26b. In deceleration segment S6, pistons 70a, 70b decelerate as pistons 70a, 70b approach the end of the fill stroke. Pistons 70a, 70b change over from the fill stroke to the pressure stroke at the end of deceleration segment S6.

Acceleration segments S1 and S4 and deceleration segments S3 and S6 are periods of time where pistons 70a, 70b are changing speed, which can reduce flow from proportioner pumps 26a, 26b thereby resulting in lower pressures and flowrates. A reduced pressure can reduce the quality of the spray generated at applicator 34 and adversely affect the material properties of the plural component material generated. Piston speed profile SP1 minimizes the time for acceleration and deceleration, providing greater pump efficiency, consistent pressure and/or flow rate, reduced pressure drop at changeover, and reduced chance of cavitation, among other benefits.

Steady speed segments S2 and S4 are periods of time where the piston speed, and therefore the pump flow and pressure, is constant. Motor 14 facilitates quick reaction to accelerate back to the speed of steady speed segments S2, S4 if proportioner pumps 26a, 26b stall mid-stroke indirectly by closing/detriggering applicator 34.

While the pumping assemblies of this disclosure and claims are discussed in the context of a plural component spraying system, it is understood that the pumping assemblies and controls can be utilized in a variety of fluid handing contexts and systems and are not limited to those discussed. Any one or more of the pumping assemblies discussed can be utilized alone or in unison with one or more additional pumps to transfer fluid for any desired purpose, such as location transfer, spraying, metering, application, etc.

Discussion of Non-Exclusive Examples

The following are non-exclusive descriptions of possible embodiments of the present disclosure.

A pumping system for a plural component spray system configured to receive first and second component materials and output a plural component material, the pumping system comprising an electric motor including a stator and a rotor, the rotor configured to rotate about a pump axis; a drive mechanism directly connected to the rotor and configured to convert a rotational output from the rotor to a linear input; a first piston of a first pump coupled to the drive mechanism to be reciprocated axially by the drive mechanism; and a second piston of a second pump coupled to the drive mechanism to be reciprocated axially by the drive mechanism.

The pumping system of the preceding paragraph can optionally include, additionally and/or alternatively, any one or more of the following features, configurations and/or additional components:

The drive mechanism further comprises a screw disposed coaxially with the rotor and configured to provide the linear input; and a plurality of rolling elements disposed between the screw and the rotor, wherein the plurality of rolling elements support the screw relative the rotor and are configured to drive the screw axially.

The plurality of rolling elements include one of balls and rollers.

The drive mechanism further includes a drive nut connected to the rotor such that rotation of the rotor drives rotation of the drive nut, and wherein the plurality of rolling elements are disposed between the drive nut and the screw.

The first piston is connected to a first axial end of the screw and the second piston is connected to a second axial end of the screw.

The first pump includes a first housing at least partially defining a first pump chamber, a first inlet valve, and a first outlet valve; and the first piston divides the first pump chamber into an upstream chamber and a downstream chamber.

Each of the first inlet valve and the first outlet valve are fixed relative the pump axis.

The first pump includes a first inlet valve and a first outlet valve, wherein at least one of the first inlet valve and the first outlet valve is oriented transverse to the pump axis.

The first pump is disposed on a first axial side of the electric motor and the second pump is disposed on a second axial side of the electric motor opposite the first axial side.

The first pump is a double displacement pump such that the first pump is configured to output fluid during each of a first stroke and a second stoke of a pump cycle of the first pump.

The second pump is a double displacement pump.

The drive mechanism includes a screw disposed coaxially with the rotor.

The drive mechanism further comprises a first screw extending in a first axial direction relative the rotor, the first screw being the screw; a second screw extending in a second axial direction relative the rotor; wherein the motor is disposed axially between the first screw and the second screw; and wherein the first screw and the second screw are connected to the rotor to rotate with the rotor.

The drive mechanism further comprises a first nut mounted to the first screw and disposed coaxially with the first screw, the first nut connected to the first piston; and a second nut mounted to the second screw and disposed coaxially with the second screw, the second nut connected to the second piston; wherein the first screw is configured to provide rotational input to the first nut to cause axial displacement of the first nut along the pump axis; and wherein the second screw is configured to provide rotational input to the second nut to cause axial displacement of the second nut along the pump axis.

The first screw has one of a left-hand thread and a right-hand thread.

The second screw has a different thread handedness than the first screw.

The second screw has the same thread handedness as the first screw.

A controller operatively connected to the electric motor, wherein the controller is configured to regulate power provided to the electric motor such that the rotor turns the drive mechanism at an operating speed capable of generating a downstream flow rate up to a target flow rate.

A controller operatively connected to the electric motor, wherein the controller is configured to regulate power provided to the electric motor such that the rotor applies torque to the drive mechanism with the pump in a stalled state during which a downstream pressure meets or exceeds an operating pressure.

The controller is further configured to regulate the power based on a target operating current.

The controller is further configured to regulate the power based on a target operating pressure.

The controller is further configured to regulate the power based on a target material flow rate and such that the operating speed does not exceed a maximum speed associated with the target material flow rate.

The controller is configured to regulate the current based on data received from at least one parameter sensor disposed downstream of one of the first pump and the second pump.

A plural component spray system includes the pumping system any preceding example, and an applicator disposed downstream of the first pump and the second pump, the applicator configured to receive a first component material from the first pump and a second component material from the second pump and to output a plural component material formed from the first component material and the second component material.

The plural component spray system of the preceding paragraph can optionally include, additionally and/or alternatively, any one or more of the following features, configurations and/or additional components:

A first feed pump disposed upstream of and fluidly connected to the first pump to provide the first component material to the first pump at a first feed pressure; and a second feed pump disposed upstream of and fluidly connected to the second pump to provide the second component material to the second pump at a second feed pressure.

A method of operating a pumping system configured to pump different first and second component materials to an applicator for mixing and forming a plural component material includes driving rotation of a rotor of an electric motor about a pump axis by a stator of the electric motor; driving, by rotation of the rotor, a screw disposed coaxially with the rotor in a first axial direction and a second axial direction; driving reciprocation of a first piston of a first pump in the first axial direction and the second axial direction thereby pumping a first component material; and driving a second piston of a second pump in the first axial direction and the second axial direction thereby pumping a second component material different than the first component material.

The method of the preceding paragraph can optionally include, additionally and/or alternatively, any one or more of the following features, configurations and/or additional components:

Mixing the first component material and the second component material in a mixer of an applicator to form a plural component spray material.

Driving the first piston in the first axial direction and through a first portion of a first pump stroke; and driving the second piston in the first axial direction and through a second portion of a second pump stroke.

Driving the first piston through the first portion of the first pump stroke causes an outlet valve of the first pump to actuate to an open state, and wherein driving the second piston through the second portion of the second pump stroke causes an inlet valve of the second pump to actuate to an open state.

A pumping system for a plural component spray system configured to receive first and second component materials and output a plural component material, the pumping system includes an electric motor including a stator and a rotor, the rotor configured to rotate about a motor axis; a drive mechanism directly connected to the rotor and configured to convert a rotational output from the rotor to a linear input; a yoke connected to the drive mechanism to be reciprocated axially by the drive mechanism; a first piston of a first pump coupled to the yoke to be reciprocated axially; and a second piston of a second pump coupled to the yoke to be reciprocated axially.

The pumping system of the preceding paragraph can optionally include, additionally and/or alternatively, any one or more of the following features, configurations and/or additional components:

The first pump is disposed on a first lateral side of the electric motor and the second pump is disposed on a second axial side of the electric motor.

Each of the first pump and the second pump are spaced in a first axial direction from the motor.

The first piston extends along a first piston axis and the second piston extends along a second piston axis, and wherein the first piston axis and the second piston axis are offset from the motor axis.

The first pump is a double displacement pump and the second pump is a double displacement pump.

The first pump and the second pump are disposed such that the first piston is configured to move through a fill stroke of the first pump simultaneously with the second piston moving through a fill stroke of the second pump.

A pumping assembly includes a motor including a stator and a rotor, the rotor configured to rotate on a motor axis; a first piston of a first pump coupled to the rotor to be reciprocated axially; a second piston of a second pump coupled to the rotor to be reciprocated axially; and a controller configured to control operation of the motor such that the first and second pistons displace according to a first speed profile during a fill stroke and according to a second speed profile during a pressure stroke, the first speed profile different than the second speed profile; wherein the first piston and the second piston are disposed such that the first piston and the second piston simultaneously proceed through respective fill strokes and pressure strokes.

The pumping assembly of the preceding paragraph can optionally include, additionally and/or alternatively, any one or more of the following features, configurations and/or additional components:

The first speed profile has a first acceleration profile and the second speed profile has a second acceleration profile different than the first acceleration profile.

A difference between the first speed profile and the second speed profile is when accelerating out of a changeover.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A pumping system for a plural component spray system configured to receive first and second component materials and output a plural component material, the pumping system comprising:
    an electric motor including a stator and a rotor, the rotor configured to rotate about a pump axis;
    a first motor bearing supporting the rotor and a second motor bearing supporting the rotor, the first motor bearing disposed at least partially axially outward of the rotor and the second motor bearing disposed at least partially axially outward of the rotor;
    a drive directly connected to the rotor and configured to convert a rotational output from the rotor to a linear input, the drive comprising a screw disposed coaxially with the rotor and configured to provide the linear input, wherein the screw extends through and is disposed directly radially inward of the first motor bearing and the second motor bearing, wherein an inner race of the first motor bearing is mounted on a drive nut of the drive, the drive nut disposed directly radially between the screw and the stator, and wherein an inner race of the second motor bearing is mounted on the drive nut;
    a first piston of a first pump coupled to the drive to be reciprocated axially by the drive; and
    a second piston of a second pump coupled to the drive to be reciprocated axially by the drive.

2. The pumping system of claim 1, wherein the drive further comprises:
    a plurality of rolling elements disposed between the screw and the rotor, wherein the plurality of rolling elements support the screw relative the rotor and are configured to drive the screw axially.

3. The pumping system of claim 2, wherein the plurality of rolling elements include one of balls and rollers.

4. The pumping system of claim 2, wherein the plurality of rolling elements are disposed between the drive nut and the screw.

5. The pumping system of claim 1, wherein:
    the first pump includes a first housing at least partially defining a first pump chamber, a first inlet valve, and a first outlet valve; and
    the first piston divides the first pump chamber into an upstream chamber and a downstream chamber.

6. The pumping system of claim 5, wherein each of the first inlet valve and the first outlet valve are fixed relative the pump axis.

7. The pumping system of claim 1, wherein the first pump includes a first inlet valve and a first outlet valve, wherein at least one of the first inlet valve and the first outlet valve is oriented transverse to the pump axis.

8. The pumping system of claim 1, wherein the first pump is disposed on a first axial side of the electric motor and the second pump is disposed on a second axial side of the electric motor opposite the first axial side.

9. The pumping system of claim 1, wherein:
    the first pump is a double displacement pump such that the first pump is configured to output fluid during each of a first stroke and a second stoke of a pump cycle of the first pump; and
    the second pump is a double displacement pump.

10. The pumping system of claim 1, further comprising:
    a controller operatively connected to the electric motor, wherein the controller is configured to:
        regulate power provided to the electric motor such that the rotor turns the drive at an operating speed capable of generating a downstream flow rate up to a target flow rate.

11. The pumping system of claim 1, further comprising:
    a controller operatively connected to the electric motor, wherein the controller is configured to:
        regulate power provided to the electric motor such that the rotor applies torque to the drive with the pump in a stalled state during which a downstream pressure meets or exceeds an operating pressure.

12. A plural component spray system comprising:
    the pumping system of claim 1;
    an applicator disposed downstream of the first pump and the second pump, the applicator configured to receive the first component material from the first pump and the second component material from the second pump and to output the plural component material formed from the first component material and the second component material;
    a first feed pump disposed upstream of and fluidly connected to the first pump to provide the first component material to the first pump at a first feed pressure; and
    a second feed pump disposed upstream of and fluidly connected to the second pump to provide the second component material to the second pump at a second feed pressure.

13. A pumping assembly for a plural component spray system configured to receive first and second component materials and output a plural component material, the pumping assembly comprising:
    a motor including a stator and a rotor, the rotor configured to rotate on a motor axis;
    a drive directly connected to the rotor and configured to convert a rotational output from the rotor to a linear input, the drive comprising a screw disposed coaxially with the rotor and configured to provide the linear input;
    a first piston of a first pump coupled to the drive to be reciprocated axially, wherein the first piston is configured to draw fluid into an upstream fluid chamber of the first pump through a first check valve during a fill stroke in which the first piston displaces in a first direction along the axis, and the first piston is configured to displace the fluid out of the upstream fluid chamber through a second check valve during a pressure stroke in a second direction along the axis, the first piston extending into a first axial end of the screw and connected to the screw by a first pin; and a second piston of a second pump coupled to the drive to be reciprocated axially by the drive, the second piston connected to a second axial end of the screw opposite the first axial end by a second pin;

a first pump support connecting the first pump to the motor and having an anti-rotation element, wherein the first pin interfaces with the first pump support to prevent rotation of the first piston on the motor axis.

* * * * *